US012797854B2

(12) United States Patent
Derfus et al.

(10) Patent No.: US 12,797,854 B2
(45) Date of Patent: Nov. 17, 2026

(54) MAGNETIC PARTICLE SEPARATION DEVICE BUFFER PACK AND CAP DESIGN

(71) Applicant: Abbott Diagnostics Scarborough, Inc., Scarborough, ME (US)

(72) Inventors: Austin M. Derfus, Solana Beach, CA (US); Neil A. Quitoviera, Temecula, CA (US); Adrian P. Crute, Escondido, CA (US); Carl G. Santavicca, Poway, CA (US); Timothy L. Higby, Temecula, CA (US); Armando R. Tovar, San Diego, CA (US)

(73) Assignee: Abbott Diagnostics Scarborough, Inc., Scarborough, ME (US)

( * ) Notice: Subject to any disclaimer, the term of this patent is extended or adjusted under 35 U.S.C. 154(b) by 641 days.

(21) Appl. No.: 18/274,405

(22) PCT Filed: Jan. 28, 2022

(86) PCT No.: PCT/US2022/014378

§ 371 (c)(1),
(2) Date: Jul. 26, 2023

(87) PCT Pub. No.: WO2022/165222

PCT Pub. Date: Aug. 4, 2022

(65) Prior Publication Data

US 2024/0100531 A1 Mar. 28, 2024

Related U.S. Application Data

(60) Provisional application No. 63/143,629, filed on Jan. 29, 2021.

(51) Int. Cl.
*B01L 1/00* (2006.01)
*B01L 3/00* (2006.01)

(52) U.S. Cl.
CPC ............... *B01L 3/523* (2013.01); *B01L 3/502* (2013.01); *B01L 2200/025* (2013.01); *B01L 2300/044* (2013.01); *B01L 2300/045* (2013.01); *B01L 2300/0609* (2013.01); *B01L 2300/0672* (2013.01); *B01L 2300/0803* (2013.01);

(Continued)

(58) Field of Classification Search
None
See application file for complete search history.

(56) References Cited

U.S. PATENT DOCUMENTS 8,062,846 B2 11/2011 Bortolin et al.
9,145,581 B1 9/2015 Lai (Continued)

*Primary Examiner* — Jyoti Mutreja
(74) *Attorney, Agent, or Firm* — Edward J. Baba; Mandar A. Joshi; Bozicevic, Field & Francis LLP

(57) ABSTRACT

Aspects of the present disclosure include a buffer pack for dispensing buffer for sample preparation using a sample preparation cartridge. Also provided are a sealing plate configured for holding the buffer pack and a cap for actuating the buffer pack in the sample preparation cartridge. Aspects of the present disclosure include a sample preparation cartridge that includes the buffer pack and the sealing plate. Aspects of the present disclosure also include a sample preparation cartridge that includes the buffer pack, the sealing plate, and the cap. Methods for filling the buffer pack, assembling a cartridge for use in sample preparation, and using the cartridge for preparing a sample also provided.

23 Claims, 18 Drawing Sheets

FIG. 1B

(52) U.S. Cl.
CPC .................. *B01L 2300/0832* (2013.01); *B01L 2400/0478* (2013.01)

(56) References Cited

U.S. PATENT DOCUMENTS

| | | | | |
|---|---|---|---|---|
| 2005/0014273 | A1 | 1/2005 | Dahm et al. | |
| 2012/0259279 | A1* | 10/2012 | Finke | A61M 5/31511 604/87 |
| 2013/0216452 | A1 | 8/2013 | Pham et al. | |
| 2015/0076069 | A1 | 3/2015 | Ellis et al. | |
| 2017/0176302 | A1* | 6/2017 | Bearinger | G01N 1/38 |
| 2019/0270086 | A1 | 9/2019 | Harding et al. | |

* cited by examiner

500

900

MAGNETIC PARTICLE SEPARATION DEVICE BUFFER PACK AND CAP DESIGN

CROSS-REFERENCE TO RELATED APPLICATIONS

This application claims the benefit of U.S. Provisional Patent Application No. 63/143,629, filed Jan. 29, 2021, which application is incorporated herein by reference in its entirety.

INTRODUCTION

Analysis of a biological sample often involves determining presence of a target analyte in the sample. The target analyte, if present, is isolated from the sample and analyzed using downstream applications, such as, amplification, immunoassay, and the like. Target analytes such as nucleic acid is isolated using approaches that include column-based isolation and purification, reagent-based isolation and purification, magnetic bead-based isolation and purification, and other technologies. Reagents, kits and instruments that find use in isolating and purifying nucleic acids are available. Poor sample preparation can lead to suboptimal results in downstream applications, and it is for this reason that optimized versions of kits have emerged to address variation in sample source, be it blood, plant tissue, fungi, bacteria, or virus.

A sample preparation process includes releasing a nucleic acid from its native biological source (e.g., lysis of cells, such as patient cells or lysis of microorganisms, such as, virus, bacteria, fungi, etc.) using chaotropic nucleic acid extraction technology, binding of nucleic acids to a solid phase (e.g., paramagnetic particles) using silica or iron oxide nucleic acid chemistry, separation of the solid phase from the residual lysis solution using magnetic separation technology, washing to remove unwanted materials, and elution or separation of nucleic acid from the solid phase using fluid handling technology. At the completion of the sample preparation protocol, the liquid comprising the nucleic acid is transferred to a collection container(s) such as PCR tubes or strips. There is an interest in automating all or individual aspects of sample preparation to increase throughput, decrease user error and/or limit exposure of users to harmful substances.

SUMMARY

Aspects of the present disclosure include a buffer pack for dispensing buffer for sample preparation using a sample preparation cartridge. Also provided are a sealing plate configured for holding the buffer pack and a cap for actuating the buffer pack in the sample preparation cartridge. Aspects of the present disclosure include a sample preparation cartridge that includes the buffer pack and the sealing plate. Aspects of the present disclosure also include a sample preparation cartridge that includes the buffer pack, the sealing plate, and the cap.

Methods for filling the buffer pack, assembling a cartridge for use in sample preparation, and using the cartridge for preparing a sample also provided.

DETAILED DESCRIPTION

Figure 1A:
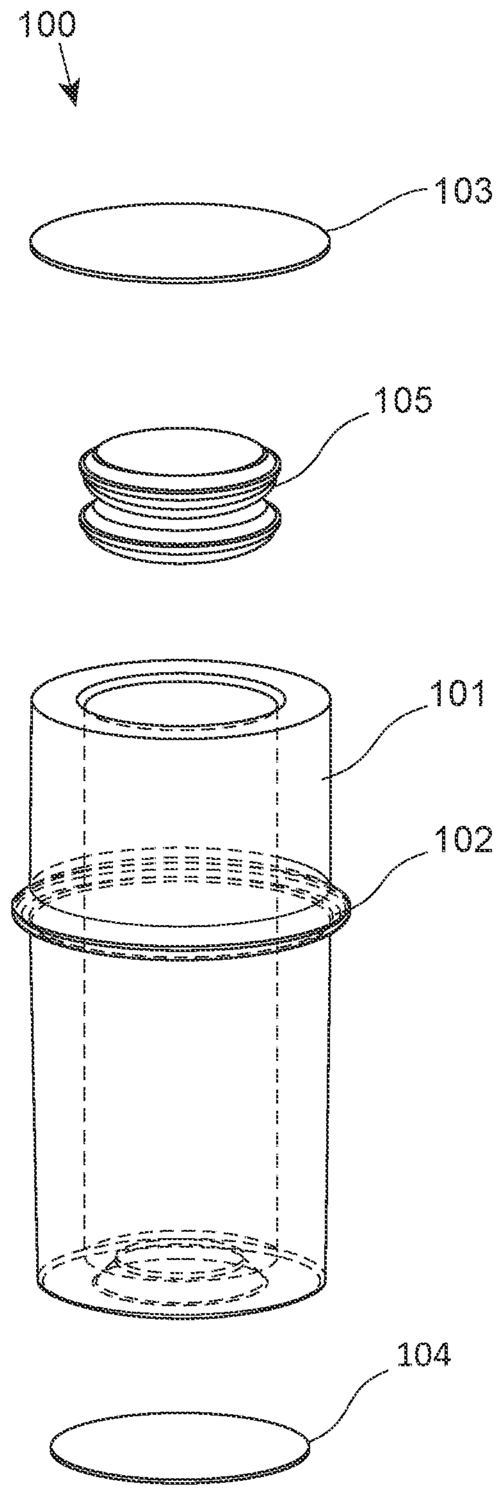
FIG. 1A depicts an exploded view of a buffer pack according to one embodiment.

Aspects of the present disclosure include a buffer pack for dispensing buffer for sample preparation using a sample preparation cartridge. Also provided are a sealing plate configured for holding the buffer pack and a cap for actuating the buffer pack in the sample preparation cartridge. Aspects of the present disclosure include a sample preparation cartridge that includes the buffer pack and the sealing plate. Aspects of the present disclosure also include a sample preparation cartridge that includes the buffer pack, the sealing plate, and the cap.

Methods for filling the buffer pack, assembling a cartridge for use in sample preparation, and using the cartridge for preparing a sample also provided.

Before the present buffer packs, sealing plates, caps, and sample preparation cartridges and methods are described in greater detail, it is to be understood that the present disclosure is not limited to particular embodiments described, as such may, of course, vary. It is also to be understood that the terminology used herein is for the purpose of describing particular embodiments only, and is not intended to be limiting.

Where a range of values is provided, it is understood that each intervening value, to the tenth of the unit of the lower limit unless the context clearly dictates otherwise, between the upper and lower limit of that range and any other stated or intervening value in that stated range, is encompassed within the buffer packs, sealing plates, caps, and sample preparation cartridges and methods. The upper and lower limits of these smaller ranges may independently be included in the smaller ranges and are also encompassed within the systems, sample preparation devices and methods, subject to any specifically excluded limit in the stated range. Where the stated range includes one or both of the limits, ranges excluding either or both of those included limits are also included in the buffer packs, sealing plates, caps, and sample preparation cartridges and methods.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present buffer packs, sealing plates, caps, and sample preparation cartridges and methods, representative illustrative present buffer packs, sealing plates, caps, and sample preparation cartridges and methods are now described.

The present disclosure may be understood more readily by reference to the following detailed description of desired embodiments and the examples included therein. In the following specification and the claims which follow, reference will be made to a number of terms which shall be defined to have the following meanings.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

The term "comprising" is used herein as requiring the presence of the named component and allowing the presence of other components. The term "comprising" should be construed to include the term "consisting essentially of" and "consisting of". The "consisting essentially of" allows the presence of the named component(s), along with other component which do not change the function/structure of the named component(s). The "consisting of" allows the presence of the named component(s), along with any adhesives or other bonding means for attaching the listed component(s).

Numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

The modifier "about" used in connection with a quantity is inclusive of the stated value and has the meaning dictated by the context. When used in the context of a range, the modifier "about" should also be considered as disclosing the range defined by the absolute values of the two endpoints. For example, the range of from about "2 to about 10" also discloses the range "from 2 to 10." The term "about" may refer to plus or minus 10% of the indicated number. For example, "about 10%" may indicate a range of 9% to 11%, and "about 1" may mean from 0.9-1.1.

It should be noted that many of the terms used herein are relative terms. For example, the terms "upper" and "lower" are relative to each other in location, i.e. an upper component is located at a higher elevation than a lower component in a given orientation, but these terms can change if the component is flipped. The terms "inlet" and "outlet" are relative to a fluid flowing through them with respect to a given structure, e.g. a fluid flows through the inlet into the structure and flows through the outlet out of the structure.

The terms "horizontal" and "vertical" are used to indicate direction relative to an absolute reference, i.e. ground level. However, these terms should not be construed to require structures to be absolutely parallel or absolutely perpendicular to each other. For example, a first vertical structure and a second vertical structure are not necessarily parallel to each other. The terms "top" and "bottom" are used to refer to surfaces where the top is always higher than the bottom relative to an absolute reference, i.e. the surface of the earth. The terms "upwards" and "downwards" are also relative to an absolute reference; upwards is always against the gravity of the earth while downwards is always towards the gravity of the earth.

The term "parallel" should be construed in its lay sense of two surfaces that maintain a generally constant distance between them, and not in the strict mathematical sense that such surfaces will never intersect when extended to infinity.

The term "virus" refers to an infectious agent that can only replicate inside another living cell, and otherwise exists in the form of a virion formed from a capsid that surrounds and contains DNA or RNA, and in some cases a lipid envelope surrounding the capsid.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present buffer packs, sealing plates, caps, and sample preparation cartridges and methods. Any recited method can be carried out in the order of events recited or in any other order which is logically possible.

Buffer Pack

As summarized above, aspects of the present disclosure include buffer packs that are configured for dispensing a buffer into a sample preparation cartridge. The buffer pack comprises a cylindrical body comprising a smooth inner surface; an outer surface comprising an engagement feature; a top end sealed with a first pierceable cover; a bottom end sealed with a second pierceable cover, wherein the first pierceable cover comprises a thickness at least twice the thickness of the second pierceable cover; a compressible stopper in a sealing configuration with the inner surface of the cylindrical body, disposed below and adjacent the first pierceable cover, wherein the compressible stopper is configured to slide against the inner surface upon application of pressure on the stopper; and a buffer disposed between the second pierceable cover and the stopper, wherein the engagement feature comprises symmetrically placed indents, a flange or two or more protrusions positioned at approximately diametrically opposite sides of the cylindrical body.

The buffer pack may be filled with any suitable buffer. In certain instances, the buffer pack is filled with a lysis buffer or an elution buffer. Any suitable lysis buffer such as those used for rupturing a cell or a virus may be used. In certain instances, the lysis buffer may include a chaotropic agent such as guanidine hydrochloride. In certain instances, a system of buffer packs comprising at least two buffer packs or at least three buffer packs is disclosed. For example, a first buffer pack may include a lysis buffer and a second buffer pack may include an elution buffer. In another example, a first buffer pack may include a lysis buffer, a second buffer pack may include an elution buffer, and a third buffer pack may include a phase immiscible with an aqueous phase, e.g., a hydrophobic liquid, such as an oil. Individual buffer packs may be discrete units, attached to each other, or packed in a single sealing plate as discussed in more detail in the next section.

The buffer packs may contain any convenient buffer in any convenient amount. In certain instances, the buffer pack may be filled with a volume of buffer that occupies 20% to 80%, e.g., 20% to 65% or 20% to 35% of the internal volume of the cylindrical body. In some instances, a buffer pack may further comprise paramagnetic particles (PMPs) or capture beads, e.g., beads coated with an agent that binds to an analyte of interest. The capture beads may be non-paramagnetic and may be separated by non-magnetic means. The agent may be an oligonucleotide, a peptide, or a protein. The buffer pack may contain any convenient amount of PMPs or capture beads, measured based on, for example, the volume or the weight of PMPs or capture beads, respectively. For example, the PMPs or capture beads may be mixed with a lysis buffer when included in a buffer pack.

In some instances, the lysis buffer can be formulated to release nucleic acid from a broad spectrum of samples, such as tissue samples, cells, viruses, or body fluid samples. The lysis buffer can also be designed to lyse all types of pathogens, such as viruses, bacteria, fungi, and protozoan pathogens.

The elution buffer may be suitable for facilitating detachment of a target analyte, e.g., a nucleic acid from the PMPs. For example, the elution buffer may include a high concentration of a salt, e.g., sodium chloride or an alkaline agent, e.g., sodium hydroxide or a low ionic strength solution such as a Tris-EDTA buffer (10 mm Tris-HCl, 0.1 mm EDTA (pH 8.0) or nuclease-free water.

A smooth inner surface of the buffer pack disclosed herein facilitates movement of the compressible stopper with minimal or no introduction of air into the buffer being dispensed. The engagement structure facilitates immobilization of the buffer pack in a sealing plate. The engagement feature may comprise a plurality of symmetrically positioned indents. The engagement feature may be a flange which is a protrusion that encircles the outer diameter of the buffer back. In another example, the engagement feature may be two or more protrusions positioned at approximately diametrically opposite sides of the cylindrical body. The engagement feature may have any suitable shape. In certain instances, the engagement feature may include an upper surface substantially perpendicular to the outer surface and to the top and bottom ends and a lower surface that is at an acute angle with respect to the upper surface and slants towards the outer surface of the buffer pack. The slanted lower surface facilitates the relative movement between the engagement feature and the sealing plate. In some instances, the engagement feature may be positioned at approximately mid-point between the top and bottom ends of the buffer pack.

As used herein, the term cylinder or cylindrical refers to a substantially cylindrical structure where the sides or walls are substantially parallel, and the cross-section is substantially circular or oval. By substantially, it is meant that there may be insignificant deviation from the stated shape. Cylinder and cylindrical encompasses a hollow cylinder, a solid cylinder, and a cylinder having a partially filled interior.

The first pierceable cover comprises a thickness at least twice the thickness of the second pierceable cover. The difference in the thickness of the covers determines the sequence in which the covers are pierced. The first pierceable cover resists being punctured and provides sufficient structural integrity for relaying downward pressure applied to the first cover to the buffer pack causing the buffer pack to move down towards a piercing member which pierces the second cover that is thinner to facilitate rupture. The first pierceable cover is also subsequentially punctured and the compressible seal moved downwards towards the punctured second cover for dispensing the buffer through the puncture in the second cover. In some instances, both the first and second covers may be made using the same material having different thickness. In some instances, the first pierceable cover and second pierceable cover may be made of different materials where the material for the first cover has a higher tensile strength than the material for the second cover. In some instances, the first pierceable cover may be formed using multiple layers of same of different materials adhered to provide an increased the tensile strength. In certain example, the first and second pierceable covers are made from aluminum. In certain example, the first and second pierceable covers are made from paper, e.g., paper comprising a water-resistant coating. In certain examples, the first pierceable cover is made from a layer of aluminum adhered to a layer of paper. In some instances, the aluminum may be PFL-018 foil or PFL-019 foil.

The compressible stopper may be made of any suitable material, such as rubber, silicone, plastic or similar material or a combination thereof. Rubber may be natural or synthetic rubber or a combination thereof.

In some instances, the buffer packs disclosed herein may have a height of about 20-40 mm, e.g., 25-35 mm; an outer diameter of about 10-20 mm, e.g., 12-18 mm; an inner diameter of about 5 mm-15 mm, e.g., 8 mm-10 mm and a thickness of 2-3 mm. The first pierceable cover may have a thickness of 60 um-150 um, e.g., 75 um-125 um, 95 um-105 um, or 90 um-110 um, such as, 80 um, 90 um, 100 um, 110 um, or 120 um and a diameter of 10-20 mm, e.g., 12-18 mm. The second pierceable cover may have a thickness of 20 um-50 um, e.g., 30 um-50 um, or 35 um-45 um, such as, 80 um, 90 um, 100 um, 110 um, or 120 um and a diameter of 10-20 mm, e.g., 12-18 mm. The stopper may have a height of about 3-5 mm and a diameter slightly larger, e.g., +0.5 mm larger than the inner diameter of the puffer pack.

Figure 1B:
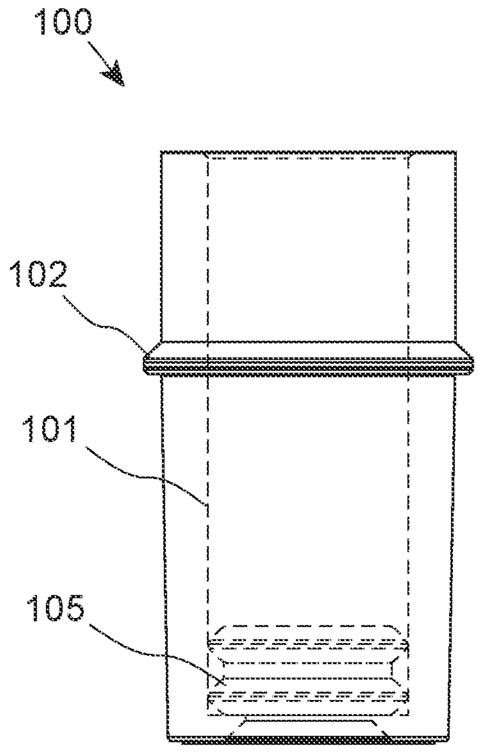
FIG. 1B depicts an assembled buffer pack according to one embodiment.

FIG. 1A shows a buffer pack 100 that includes a hollow cylindrical body 101 comprising a smooth inner surface and an outer surface comprising an engagement feature 102. The first pierceable cover 103, the second pierceable cover 104, and the compressible stopper 105 are visible in the exploded view shown in FIG. 1A. FIG. 1B shows an assembled buffer pack in an upside-down configuration. The engagement feature 102 includes a lower surface that slants towards the outer surface.

Figure 2C:
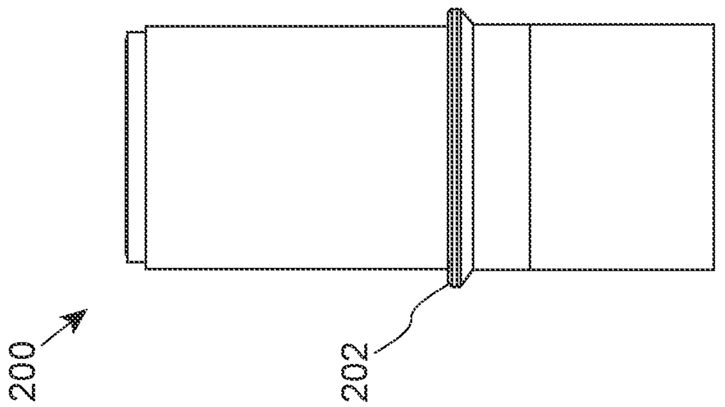
FIG. 2C depicts the buffer pack shown in FIG. 2B after being assembled.
Figure 2B:
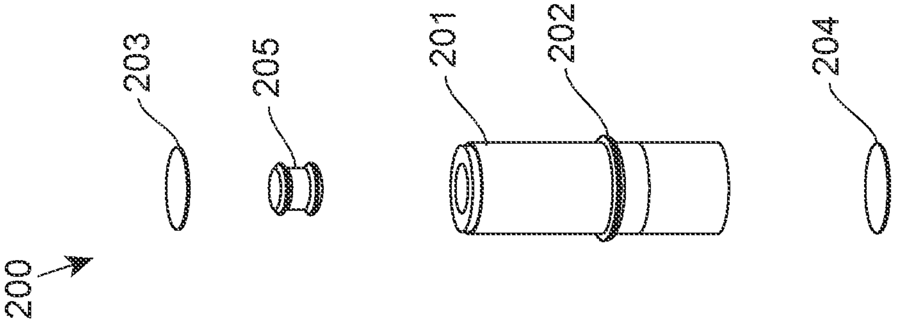
FIGS. 2A and 2B show a side-by-side comparison of a buffer pack for dispensing a lysis buffer (FIG. 2A) and a buffer pack for dispensing an elution buffer (FIG. 2B).
Figure 2A:
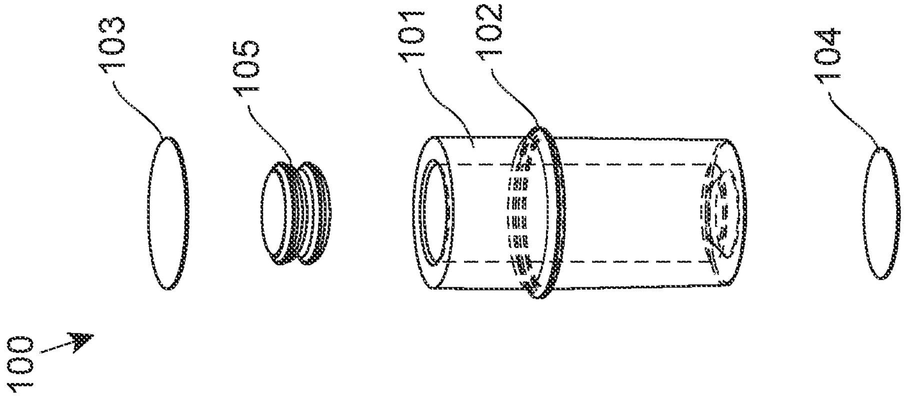

FIGS. 2A and 2B show two different buffer packs. The buffer pack shown in FIG. 2A is larger than the buffer pack shown in FIG. 2B in both length and diameter. Similar to the buffer pack 100, buffer pack 200 also includes a cylindrical body 201, a first pierceable cover 203, a compressible stopper 205, an engagement feature 202, and a second pierceable cover 204. FIG. 2C shows the buffer pack 200 once assembled. The engagement feature 202 also includes a slanted surface.

Also provided herein is a method for filling the buffer pack with a buffer. In certain instances, the method may include installing the compressible stopper and sealing the top end with the first pierceable cover, followed by filling the buffer into the cylindrical body and sealing the bottom end with the second pierceable cover.

Installing the stopper may involve inserting the stopper into the cylindrical body and sliding the stopper to the desired position. The desired position can be determined based upon the volume of buffer to be filled and/or the amount of buffer to be dispensed. The stopper may be lubricated for ease of installation. Sealing of the covers may involve using an adhesive or may involve heat sealing.

Sealing Plate

Also provided herein is a sealing plate that immobilizes the one or more buffer packs as disclosed herein and can be used for placing the buffer pack(s) in a sample preparation cartridge in which the buffer is to be dispensed. The configuration of the sealing plate can vary depending on the type of sample preparation cartridge. In some instances, the sealing plate comprises a substantially disk-shape comprising an upper surface opposite a lower surface, a first through-hole extending between the surfaces, the first through-hole comprising at least two diametrically opposite retaining features that extend from the lower surface and attach to a lower surface of the engagement feature of the buffer pack provided herein. The sealing plate may further include a centrally located opening for aligning the sealing plate with additional components of a sample preparation cartridge. In some instances, the opening may include a shaft, e.g., a hollow shaft that extends down from the lower surface. In some instances, the shaft extends up from the upper surface. In some instances, the shaft extends above and below the surfaces of the sealing plate.

In some instances, the shaft is hollow and comprises indents located in an interior surface of the shaft wherein the indents are located along an internal diameter of the shaft. The indents are used for placing a cap that is used for actuating the buffer pack to dispense buffer in the sample preparation cartridge.

Figure 3A:
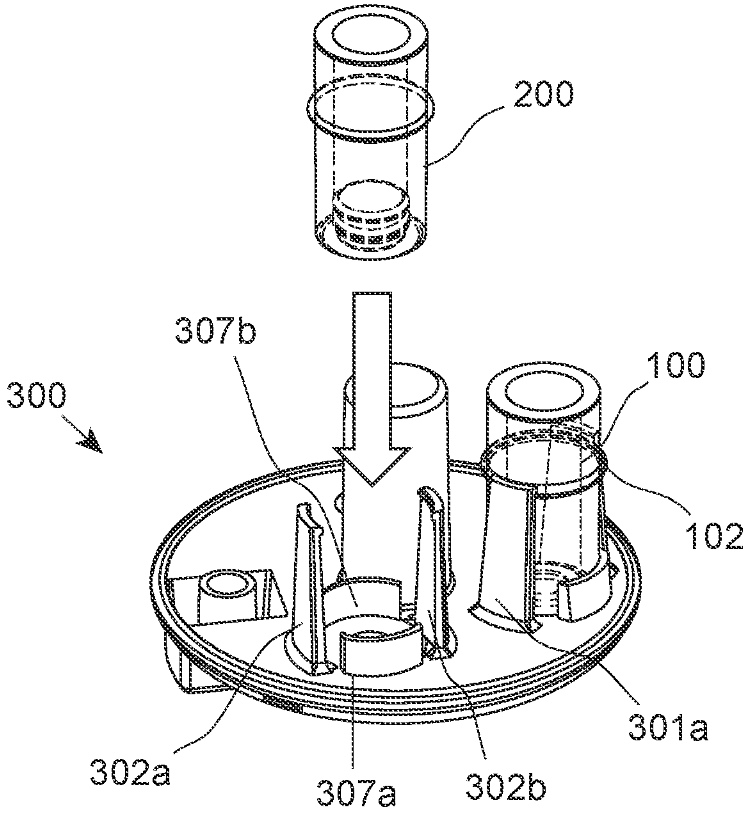
FIGS. 3A-3D show a sealing plate and buffer packs according to one embodiment of the present disclosure.

An example of a sealing plate is depicted in FIGS. 3A-3D. FIGS. 3A-3D show a sealing plate 300 comprising buffer packs 100 and 200. FIG. 3A shows the lower surface of the sealing plate comprising two diametrically opposite retaining features 301*a* and 301*b* (not visible from the shown angle) that extend from the lower surface and attach to a lower surface of the engagement feature 102 of the buffer pack 100. Alternatively, when the engagement features are indents, the retaining features may slide into the indents to immobilize the buffer packs. Also depicted is a second buffer pack 200 that can be inserted in between the engagement features 302*a* and 302*b*. A centrally located hollow shaft 303 is also visible. The lower end of the shaft may be closed (as shown) or may be open.

Figure 3B:
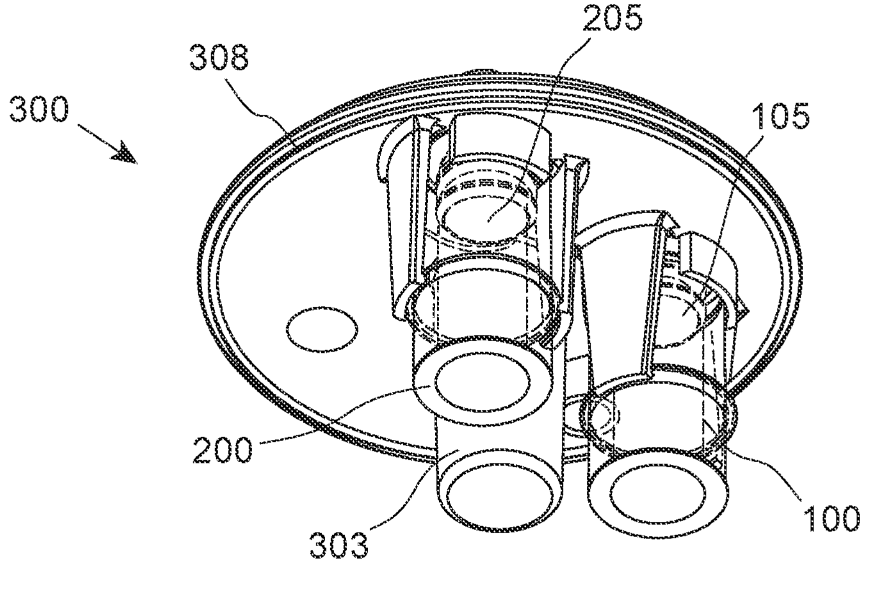

In certain instances, additional features to guide the installation and/or facilitate retention of the buffer pack may be included on the lower surface of the sealing plate. Such exemplary features 307*a* and 307*b* are depicted in FIGS. 3A and 3B.

Figure 3C:
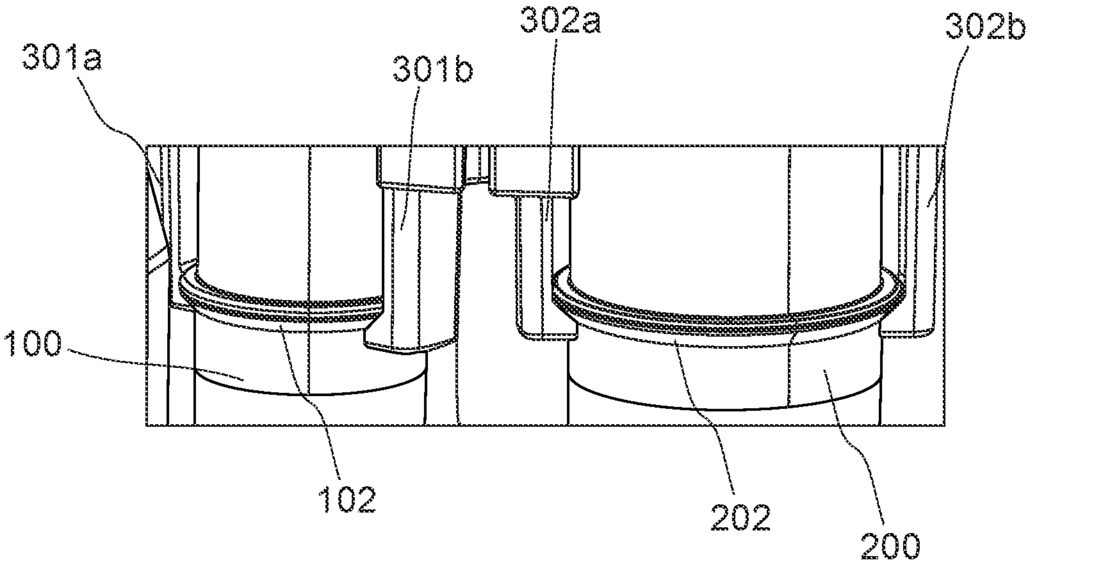

FIG. 3C is a zoomed-in view of the engagement feature (102 and 103) of the buffer packs and the retaining features (301*a* and 301*b* and 302*a* and 302*b*) of the sealing plate. As seen in the figure the retaining features include a slope at the tip which matches the slope of the engagement feature (102 and 103) which facilitates the sliding down of the buffer pack upon application of downward pressure on the first pierceable cover of the buffer pack.

Figure 3D:
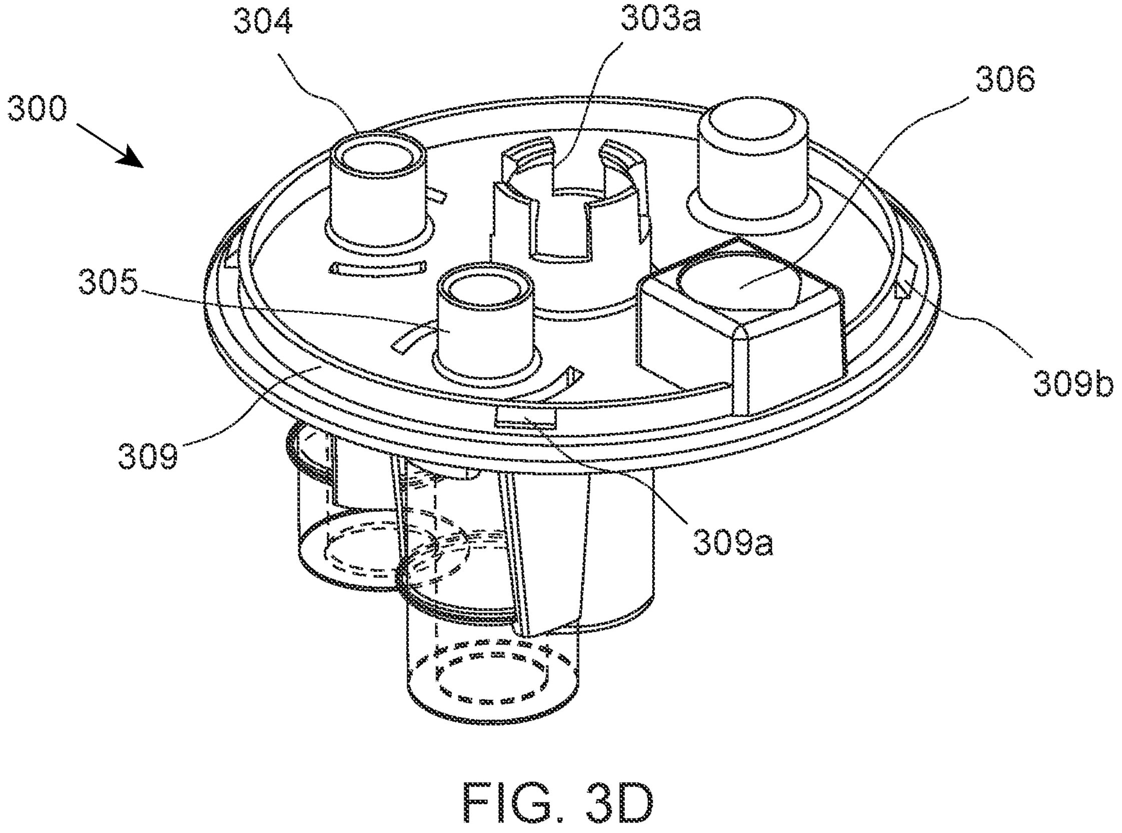

FIG. 3D shows a sealing plate with optional features that may be included on the upper surface. Such optional features include a guide members 303*a*, 304, and 305. Guide member 303*a* can be used to align a cap for actuating the buffer pack(s) with the central opening in the sealing plate. Guide member 304 and 305 can be used to align the actuating members of the cap with the top ends of the respective buffer packs.

The size and shape of the engagement features can vary, and can be determined by the size and shape of the buffer packs. The opening at which the engagement features are located is generally smaller in diameter that the outer diameter of the buffer pack. In some instances, the diameter of the opening is substantially same as the internal diameter of the buffer pack. In some instances, the diameter of the opening is substantially smaller than the internal diameter of the buffer pack and may be sized to allow passage of the actuating member of the cap.

In the sealing plate depicted in FIG. 3D, a sample inlet 306 is positioned in the upper surface of the sealing plate. The sealing plate may have any size which can be determined based upon the size of the sample preparation cartridge. The sealing plate depicted in the figure includes a disk-shape having a first diameter that is sized to sufficiently cover the top end of a sample preparation cartridge as disclosed herein. The upper surface of the sealing plate include an upwardly extending wall that is disposed adjacent the periphery of the disk providing a locking shape that is enclosed by the cap described herein.

Cap for Actuating Buffer Pack

As mentioned in the preceding sections, a cap for actuating the one or more buffer packs as disclosed herein is also provided. The cap is sized to fit over the sealing plate described in the preceding sections. The cap includes an upper surface opposite a lower surface; and a first actuating member extending downwards from the lower surface. The first actuating member is aligned with the first pierceable cover of the buffer pack and is configured to pass through the first through-hole of the sealing plate. The cap is placed in a first position in which the cap is spaced-apart from the upper surface of the sealing plate. When the cap is in the first position the first actuating member does not exert downward force on the buffer pack.

The cap may have any shape and size that is compatible with the sealing plate used for immobilizing the buffer packs(s). In certain instances, the cap may have a disc shape. The upper surface and lower surface of the cap may be substantially planar is some instances. In another example, the upper surface of the cap may include an elevated area located substantially centrally on the upper surface. The elevated area may be included to increase ease of use by providing a target area for applying downward pressure on the cap. The cap may include a rim-shaped boundary sized to enclose the periphery of the sealing plate when the cap is pushed downwards. The rim-shaped boundary may include members for affixing the cap to the sealing plate. Such members include protrusions or indentations that facilitate snapping together of the cap and sealing plate.

Figure 4:
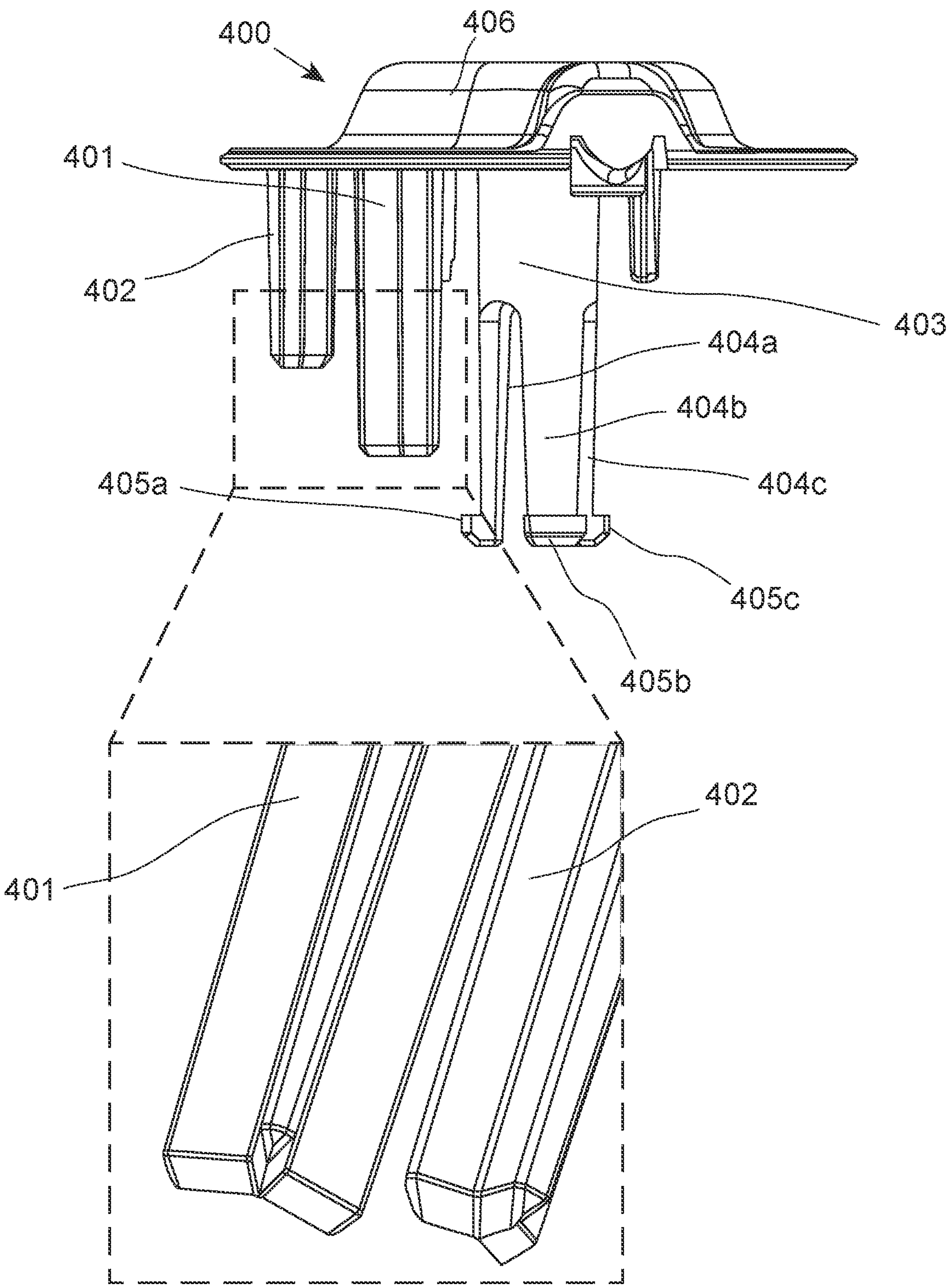
FIG. 4 shows a cap for actuating buffer packs according to one embodiment of the present disclosure.

The first actuating member is an elongated structure having substantial rigidity to maintain shape and transmit downward pressure applied on the upper surface of the cap to the top end of the buffer pack(s). In certain aspects, the first actuating member may be made from plastic or from metal. The first actuating member includes a semi-pointed tip that contacts the first pierceable cover. As used herein, semi-pointed tip refers to a structure that includes a tip that does not include a sharp edge and is designed to puncture the first pierceable cover mainly by application of pressure on the cover rather than by cutting through the cover. Examples, of semi-pointed ends include edge of a butter-knife. In certain aspects, the first actuating member includes an elongated structure comprising a cylindrical shape with a semi-pointed end or a square shape with a semi-pointed end. In certain instances, the elongated structure is formed from three planar columns attached along a long-edge as shown in FIG. 4. The semi-pointed tip of the elongated structure is formed from the ends of the planar columns which end are provided with a semi-sharp edge. The design of the actuating member ensures that the first pierceable cover is not punctured by the actuating member immediately after application of downward pressure on the cover. In addition, the combination of the design of the actuating member and thickness of the first pierceable cover ensures that the actuating member displaces the buffer pack downwards before it punctures the first pierceable cover.

In certain aspects, the sealing plate may include two or more buffer packs and the cap may include two or more actuating members, where the first actuating member contacts the first buffer pack, the second actuating member contacts the second buffer pack, and so on. The length of the two or more actuating members may be the same or may be different. For example, the length of the actuating members may be different which in turn result in different timing for actuating the buffer packs. In certain instances, the sealing plate may include a first buffer pack and a second buffer pack, and the cap may include a first actuating member aligned with the first buffer pack and a second actuating member aligned with the second buffer pack. The first actuating member may be longer than the second actuating member such that the first actuating member contacts the first buffer pack before the second actuating member contacts the second buffer pack. In addition, the shorter actuating member may dispense smaller volume of buffer from the second buffer pack as compared to the first buffer pack. The two actuating members may be arranged in any configuration. For example, the actuating members may be adjacent to each other or located symmetrically.

As used herein, the term "actuating" as used in the context of the cap and buffer pack(s) refers to the downward movement of the buffer pack upon application of downward pressure on the cap and the puncturing of first pierceable cover. As explained more in the next section, the downward movement of the buffer pack results in piercing of the second pierceable cover on the buffer pack(s).

In certain instances, the cap may include a centrally located post extending downwards from the lower surface and sized to fit inside the shaft in the sealing plate. The post can be used to align the cap with the central opening in the sealing plate. The post may include protrusions sized to fit inside the indents in the shaft and hold the cap in the first position. Upon application of downward pressure on the cap, the protrusions disengage from the indents allowing the post to slide down the shaft such that the cap encloses the periphery of the sealing plate and snap-fits onto the sealing plate.

The post may include a rod-shaped structure comprising a plurality of fingers extending from a distal end of the rod-shaped structure, wherein the protrusions are located at a distal end of the plurality of fingers and wherein the shaft in the sealing plate comprises a diameter larger than the diameter of the post and wherein the shaft comprises a lip at a distal end and wherein upon application of downward pressure on the cap, the protrusions disengage from the indents allowing the post to slide down the shaft such that the protrusions are located under the lip and the cap cannot be retracted. As used herein, the term "distal end" refers to the end located further away from a reference point as compared to a proximal end which is located closer to the reference point. In this context, the distal end of the post is the end located towards the bottom end of the post while the top end of the post is attached to the cap.

An example of a cap of the present disclosure is depicted in FIG. 4. The cap 400 includes an elevated area 406 on the upper surface in shape of a dome, a first actuating member 401 located adjacent a second actuating member 402; and a central post 403 comprising a plurality of fingers 404*a*-404*c* extending from a distal end of post 403 and comprising a plurality of protrusions 405*a*-405*c*. A close-up view of the ends of the actuating members showing the semi-pointed ends is included. The semi-pointed ends include a semi-sharp edge for applying downward pressure on the buffer pack prior to puncturing the first pierceable cover.

Figure 5:
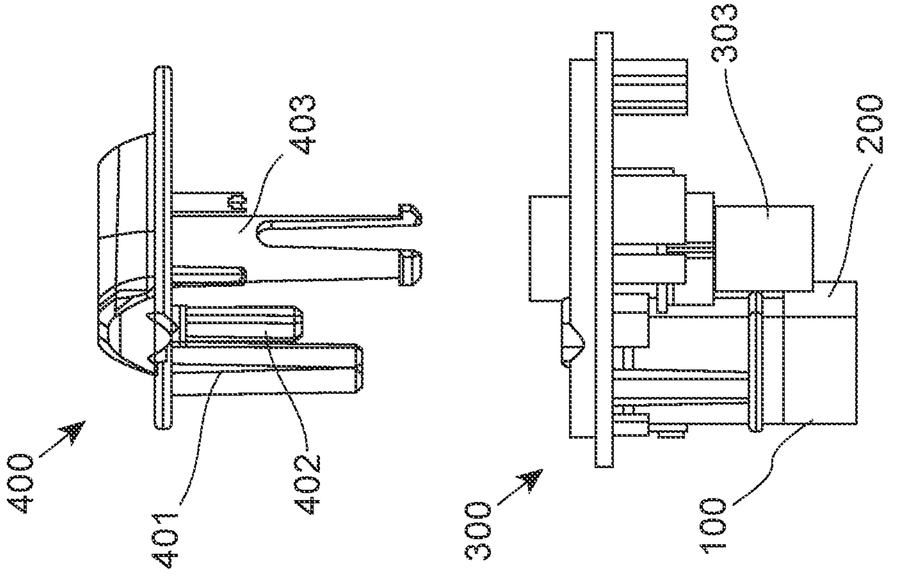
FIG. 5 shows a cap, a sealing plate and buffer packs according to one embodiment of the present disclosure.

FIG. 5 depicts a cap 400 aligned over the sealing plate 300 such that the post 403 is aligned with the central opening in the sealing plate encircled with the shaft 303 and the actuating member 401 is aligned with buffer pack 100 and the actuating member 402 is aligned with buffer pack 200.

The first and second positions for the cap with reference to the sealing plate will be further described in the following section.

Sample Preparation Cartridge

The buffer pack, sealing plate, and the cap described herein may be used in conjunction with any sample preparation device, wherein the principal of operation of the cap is as described herein. As would be understood the shapes of the buffer pack, sealing plate, and the cap can vary as long as the shapes are compatible with the operation of the cap and dispensation of the buffer from the buffer pack. In certain embodiments, shapes of the buffer pack, sealing plate, and the cap determined by shape of the sample preparation device. In certain instances, the sample preparation device may be a sample preparation cartridge comprising a cylindrical structure comprising a top end and a bottom end and an annular wall extending between the top and bottom ends. The bottom end may be substantially closed while the top end of the cylindrical structure may be substantially open. The open top end of the cylindrical structure may be covered by a sealing plate as described herein.

Figure 6A:
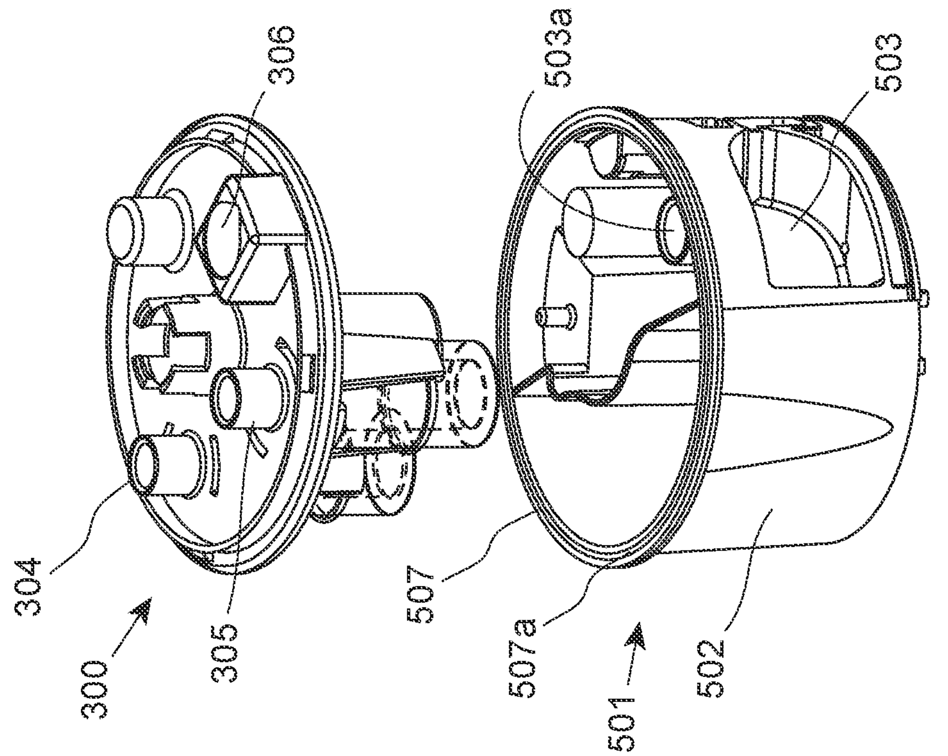
FIG. 6A shows a sample preparation cartridge with a sealing plate and buffer packs.

FIG. 6A shows a sample preparation cartridge 500 having a cylindrical structure 501 and a sealing plate 300. FIG. 6A shows the sealing plate 300 aligned with the cylindrical structure 501 in the orientation in which the two components are assembled. The cartridge 500 includes an annular wall 502 and chamber for processing a sample. A chamber 503 is depicted and is located on the annular wall and includes an opening 503*a*. As seen in FIG. 6A, the sample inlet 306 in the sealing plate 300 is aligned with the opening 503*a.*

Figure 6B:
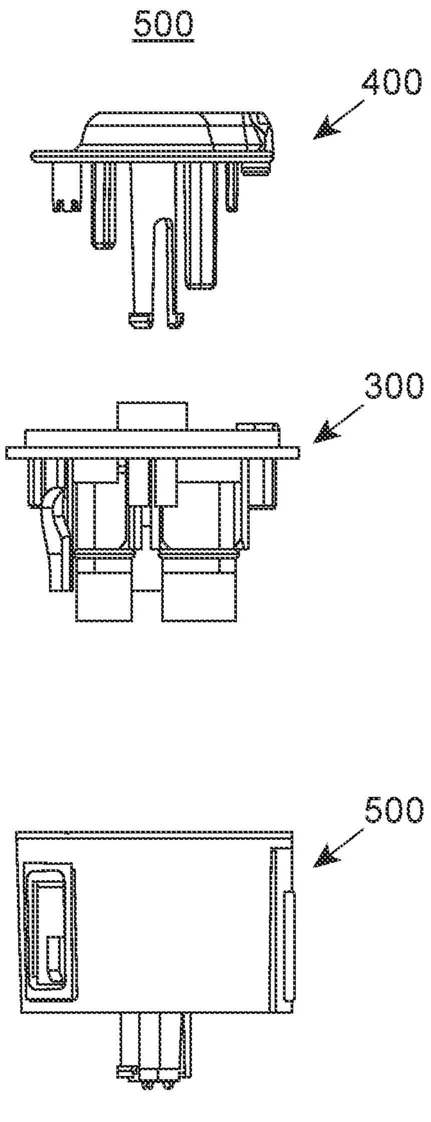
FIG. 6B shows a sample preparation cartridge with a sealing plate, buffer packs, and a cap.
Figure 6C:
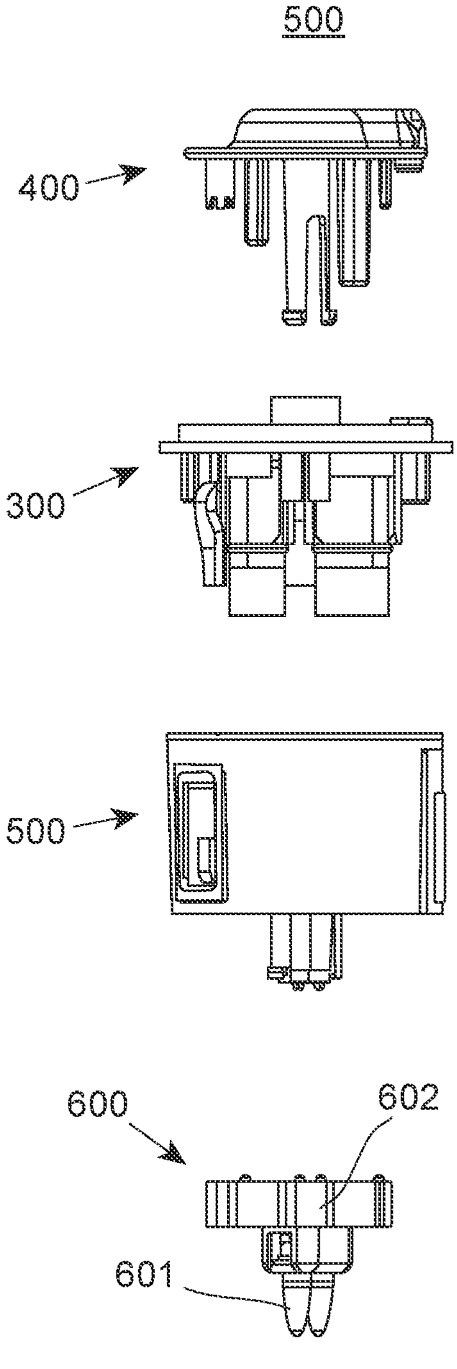
FIG. 6C shows a sample preparation cartridge with a sealing plate, buffer packs, a cap, and PCR tubes.

FIG. 6B shows the sample preparation cartridge 500 with the cylindrical structure 501, the sealing plate 300, and a cap 500. FIG. 6C shows the sample preparation cartridge 500 with the cylindrical structure 501, the sealing plate 300, the cap 500, and collection member 600. The collection member includes PCR tubes 601 and an attachment member 602 for attaching the collection member to the bottom end of the cylindrical structure 501.

In certain instances, the bottom end of the cylindrical structure may include an upper surface opposite a lower surface and at least one buffer pack support feature on the upper surface. The buffer pack support feature may include a hollow cylindrical structure rising from the upper surface of the bottom end of the cartridge and sized to enclose the bottom end of the buffer pack.

The upper surface of the bottom end of the cylindrical structure may include a piercing member pointed up towards the second pierceable cover of the buffer pack. In certain instances, the piercing member may be positioned within the buffer pack support feature. For example, the piercing member may be positioned substantially centrally within the buffer pack support feature on the upper surface of the bottom end of the cylindrical structure. The piercing member may have any suitable configuration. In one example, the piercing member may include a hollow needle-like structure with a channel connected to the hollow structure, the channel directing the flow of buffer from the buffer pack to one of the chambers in the cartridge. In another example, the piercing member may include two or more upwardly pointed sharp tips arranged around a central opening which opening is connected to a channel directing the flow of buffer from the buffer pack to one of the chambers in the cartridge. In yet another example, four fan-like spokes are arranged symmetrically in the buffer pack support feature. Each of the spokes terminate into an upwardly pointed tip and together enclose a capillary space that feeds into the channel in the bottom end of the cartridge. The four fan-like spokes may reduce fluidic resistance at the interface between the second pierceable cover of the buffer pack and the space below the piercing member to facilitate flow of buffer from the buffer pack into the channel.

Figure 6D:
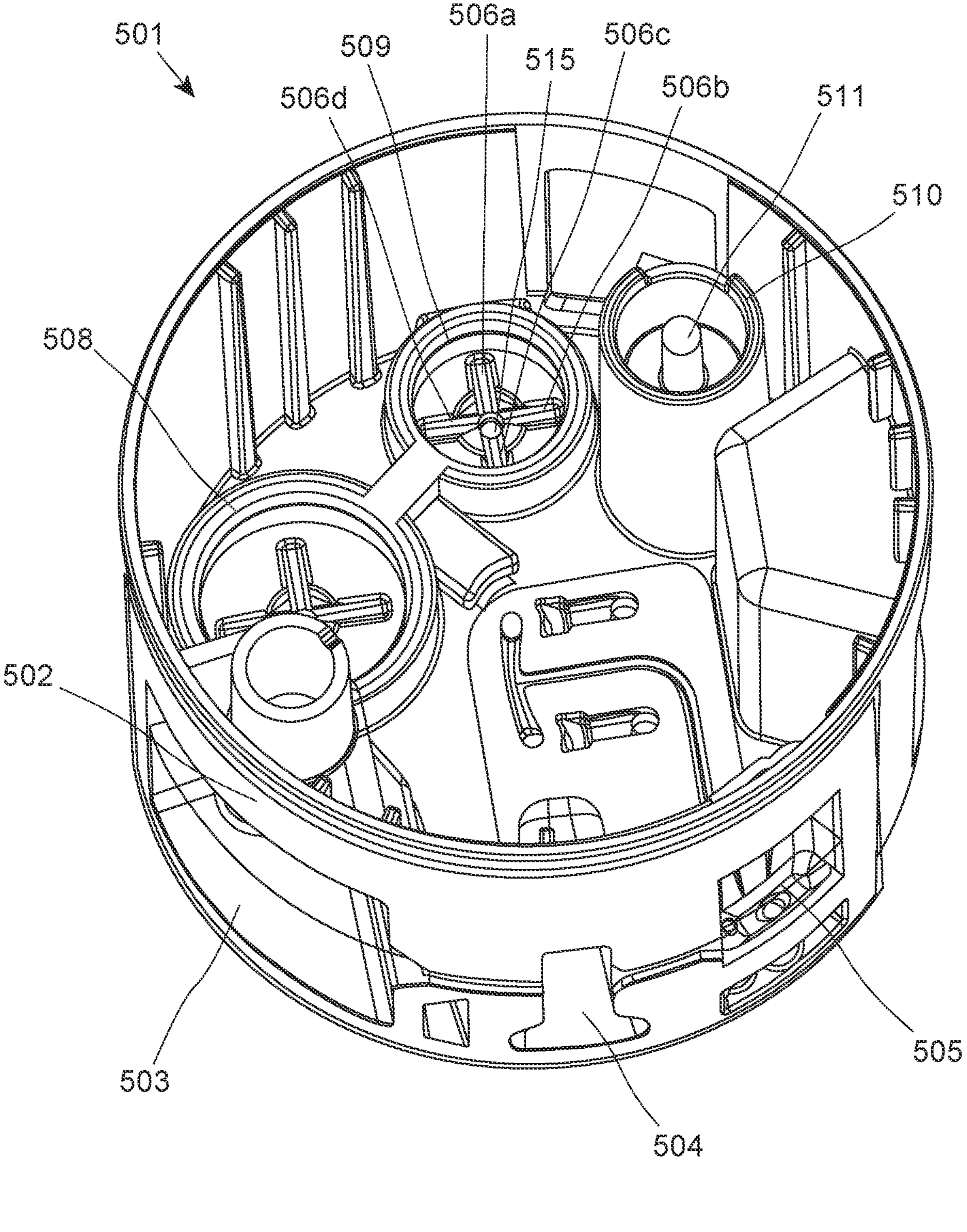
FIG. 6D shows the interior of a cylindrical structure of a sample preparation cartridge according to an embodiment of the present disclosure.

FIG. 6D shows the interior of a cylindrical structure of a sample preparation cartridge according to an embodiment of the present disclosure. Three chambers 503, 504, and 505 are also visible on the annular wall 502 of the cylindrical structure 501. The upper surface of the bottom end of the cylindrical structure includes two buffer pack support features 508 and 509 which are substantially cylindrical in shape. Each of the buffer pack support features 508 and 509 include a centrally positioned opening 515. The opening is bordered by four pointed-tips forming the piecing member 506 (see FIGS. 7A-7D). The four pointed-tips are each present at one end of four spoke-like structures 506*a*-506*d.*

Figure 7B:
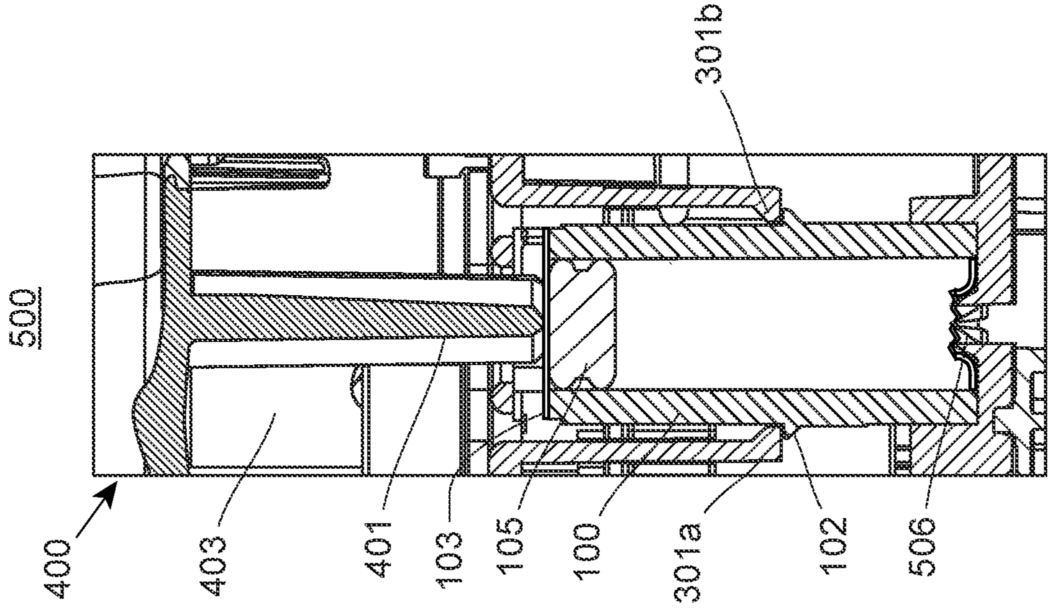
FIGS. 7A-7D show the buffer pack and the cap in progressive stages for dispensing buffer from the buffer pack.
Figure 7A:
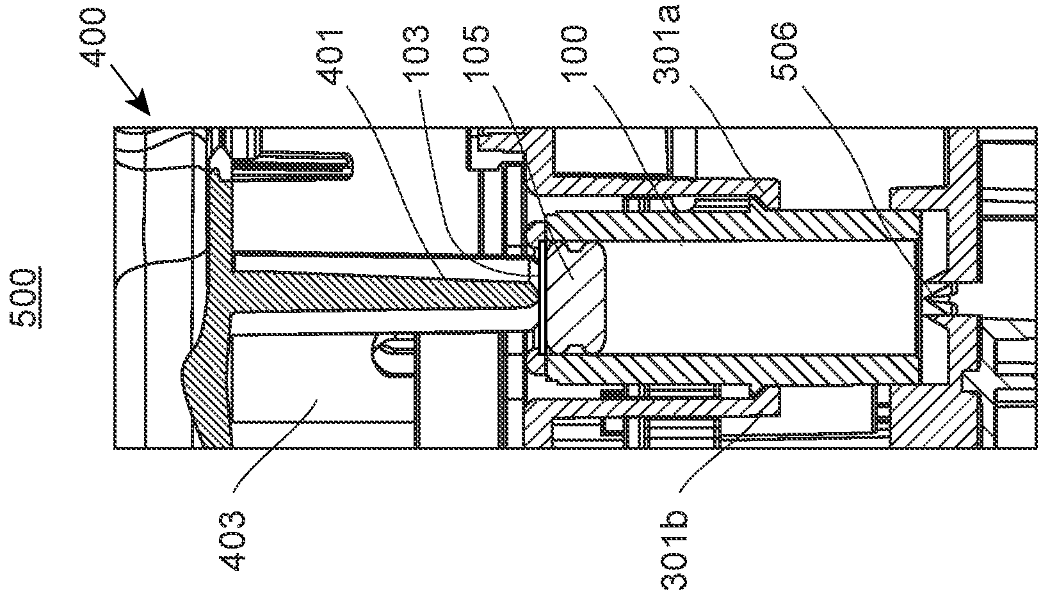
Figure 7C:
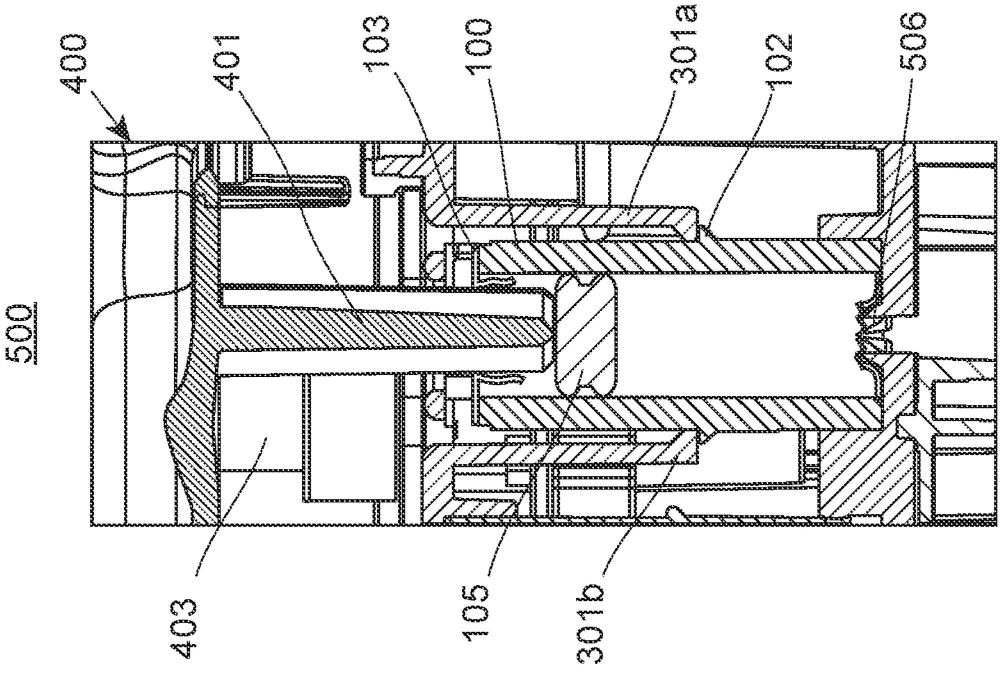
Figure 7D:
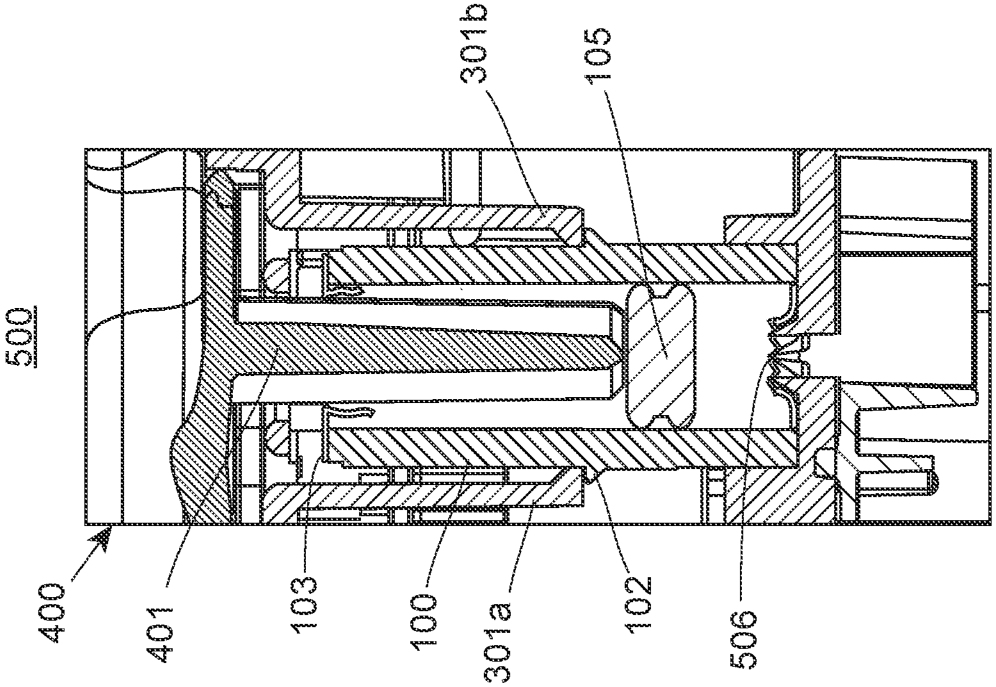

In certain instances, the actuation of the buffer pack is performed as illustrated in FIGS. 7A-7D. FIGS. 7A-7D show a partial view of a vertical cross-section of an interior region of the sample preparation cartridge 500. The cap 400, buffer pack 100, retaining features 301*a* and 301*b* of sealing plate, and the piercing member 506 present on the upper surface of the bottom end of the cartridge are depicted. FIG. 7A, the cap 500 is in the first position in which the actuating member 401 does not exert downward force on the buffer pack 10 and the retaining features 301*a* and 301*b* hold the buffer pack such that it is suspended above the piercing member 506. FIG. 7B, shows the first step in actuation of the buffer pack which occurs as a user starts applying downward force on the cap. In this first step, the actuating member 401 exerts downward force on the first pierceable cover of the buffer pack causing the retaining features 301*a* and 301*b* to slide past the engagement features 102 of the buffer pack and pushing the second pierceable cover into contact with the piercing member 506 which pierces the second pierceable cover. FIGS. 7C and 7D show the process of dispensing of the buffer present in the buffer pack. As the user continues with application of downward pressure on the cap, the actuating member applies further pressure on the first pierceable cover, punctures the first pierceable cover and contacts the compressible stopper 105 pushing it downwards and causing the buffer stored in the buffer pack to be released via the hole created in the second pierceable cover by the piercing member 506. The final position of the compressible stopper 105 is determined by the length of the actuating member 401 which in turn determines the volume of the buffer released from the buffer pack.

Figure 8B:
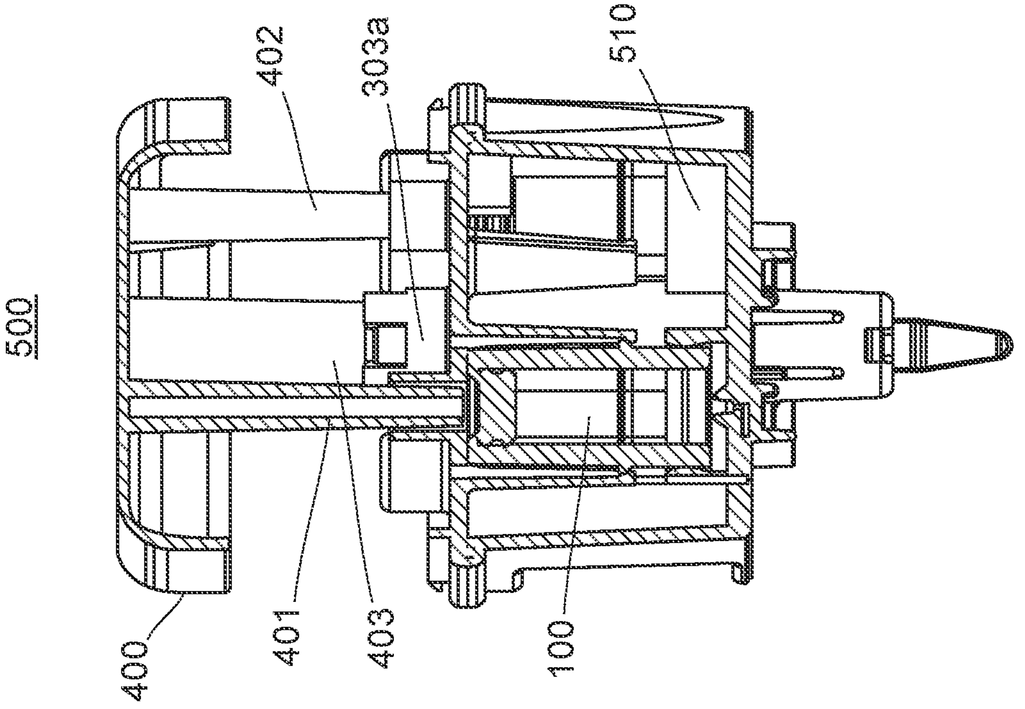
FIGS. 8A-8B show the sample preparation cartridge with the cap is pre-activation stage.
Figure 8A:
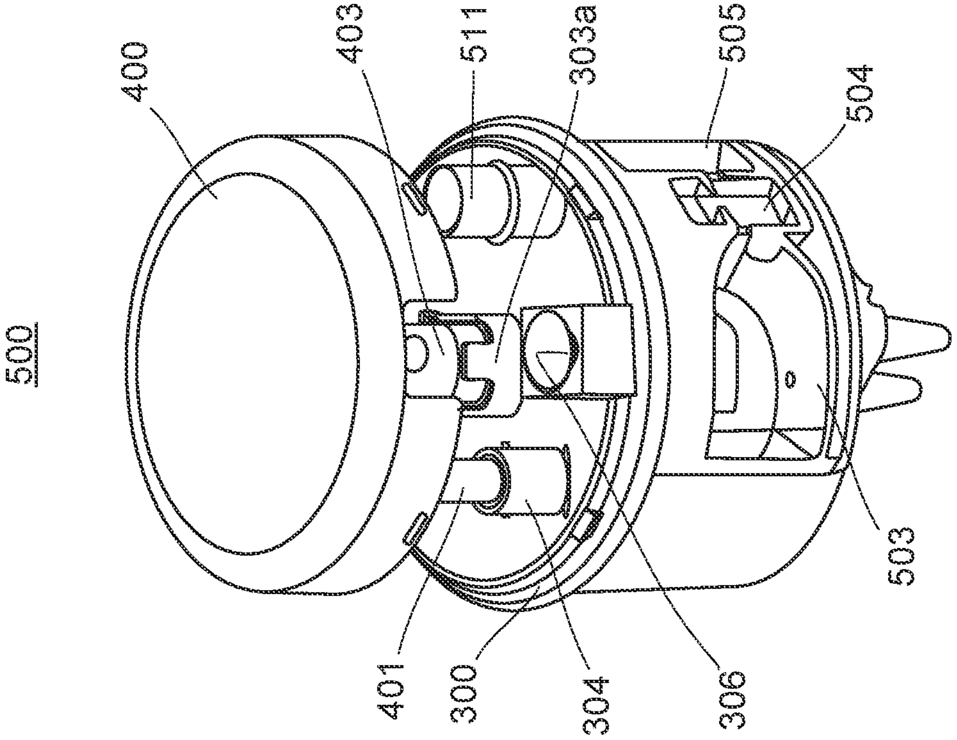
Figure 8C:
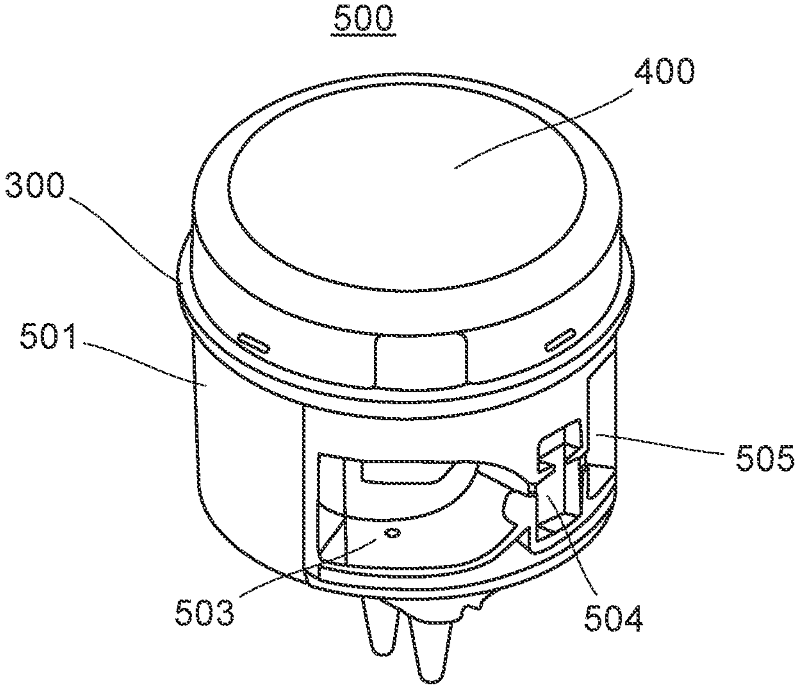
FIGS. 8C-8D show the sample preparation cartridge with the cap is post-activation stage.

FIGS. 8A-8C depicts exterior view of the sample preparation cartridge during the actuation of the buffer pack. In FIGS. 8A and 8B, the cartridge is depicted in a pre-activation stage, i.e., where the cap is in the first position in which the actuating member 401 is not exerting downward pressure on the buffer pack 100. While not necessary, in certain instances, a guide member 304 is included on the upper surface of the sealing plate around the first opening in the sealing plate under which the buffer pack 100 is positioned. The actuating member may be inserted into guide member when the cap is in the first position. The cap is held in the first position by features located on the central post 403 of the cap and the shaft 303 of the sealing plate. These features are described in the preceding sections and may include protrusions on the post which mate with indentations on the interior surface of the shaft. The shaft may extend above the upper surface of the sealing plate to provide a guide member 303*a* for insertion of the post 403. FIG. 8A also depicts a sample inlet 306 which may be used to introduce a sample into chamber 503 prior to actuation of the buffer pack by application of downward force on the cap 400.

Figure 8D:
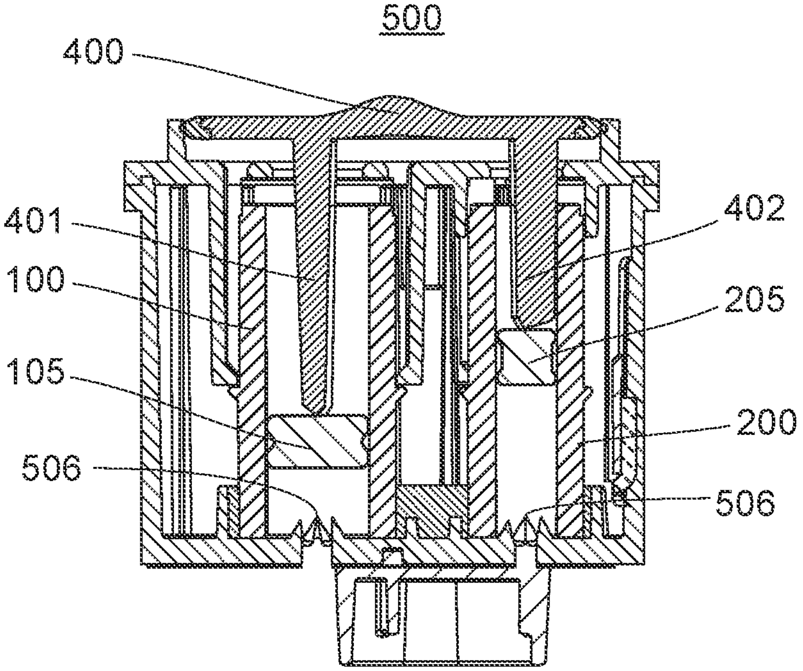

FIGS. 8C-8D depict the cartridge in a post-activation stage, i.e., where the cap is in the second position in which the actuating member has moved through the buffer pack and the buffer has been dispensed. In FIGS. 8C and 8D, the cap 400 is in the second position in which it is no longer movable in the downward direction and encloses the upper surface of the sealing plate 300. FIG. 8D shows an interior of the cartridge 500 which includes two buffer packs 100 and 200. The actuating members 401 and 402 for the buffer packs 100 and 200, respectively, are positioned inside the buffer pack in the post-actuation stage. The cover in this example also shows an optional dome feature.

The sample preparation cartridge can be supplied in an assembled form. An example of an assembled cartridge includes a cartridge that includes a cylindrical structure, a sealing plate comprising one or more buffer packs, and a cap positioned over the sealing plate in the pre-activation stage. Such an assembled cartridge is shown in FIGS. 8A and 8B.

Figure 13A:
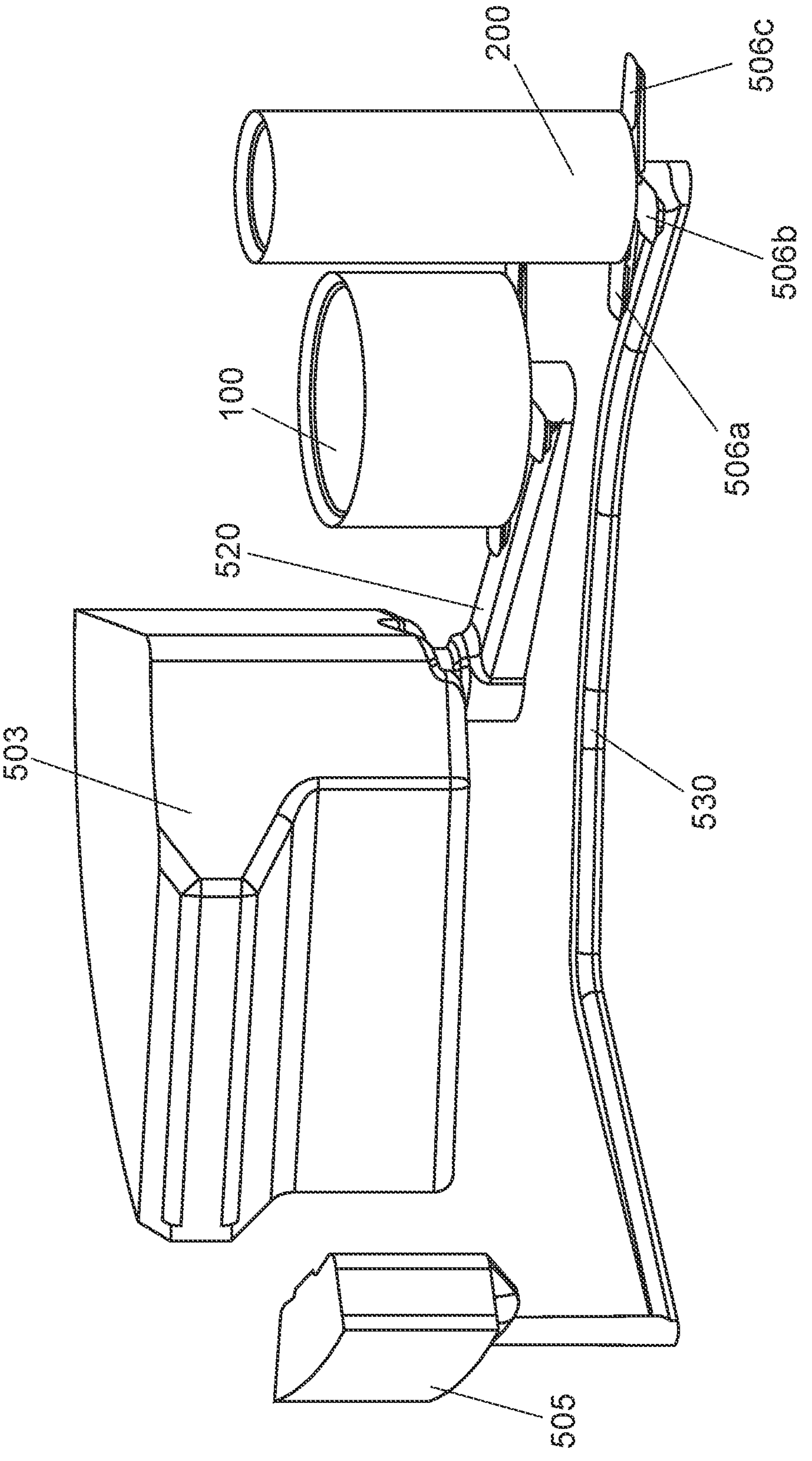
FIGS. 13A-13C show an example of fluidic connections between the buffer packs and chambers in a cartridge according to one embodiment of the present disclosure.
Figure 13B:
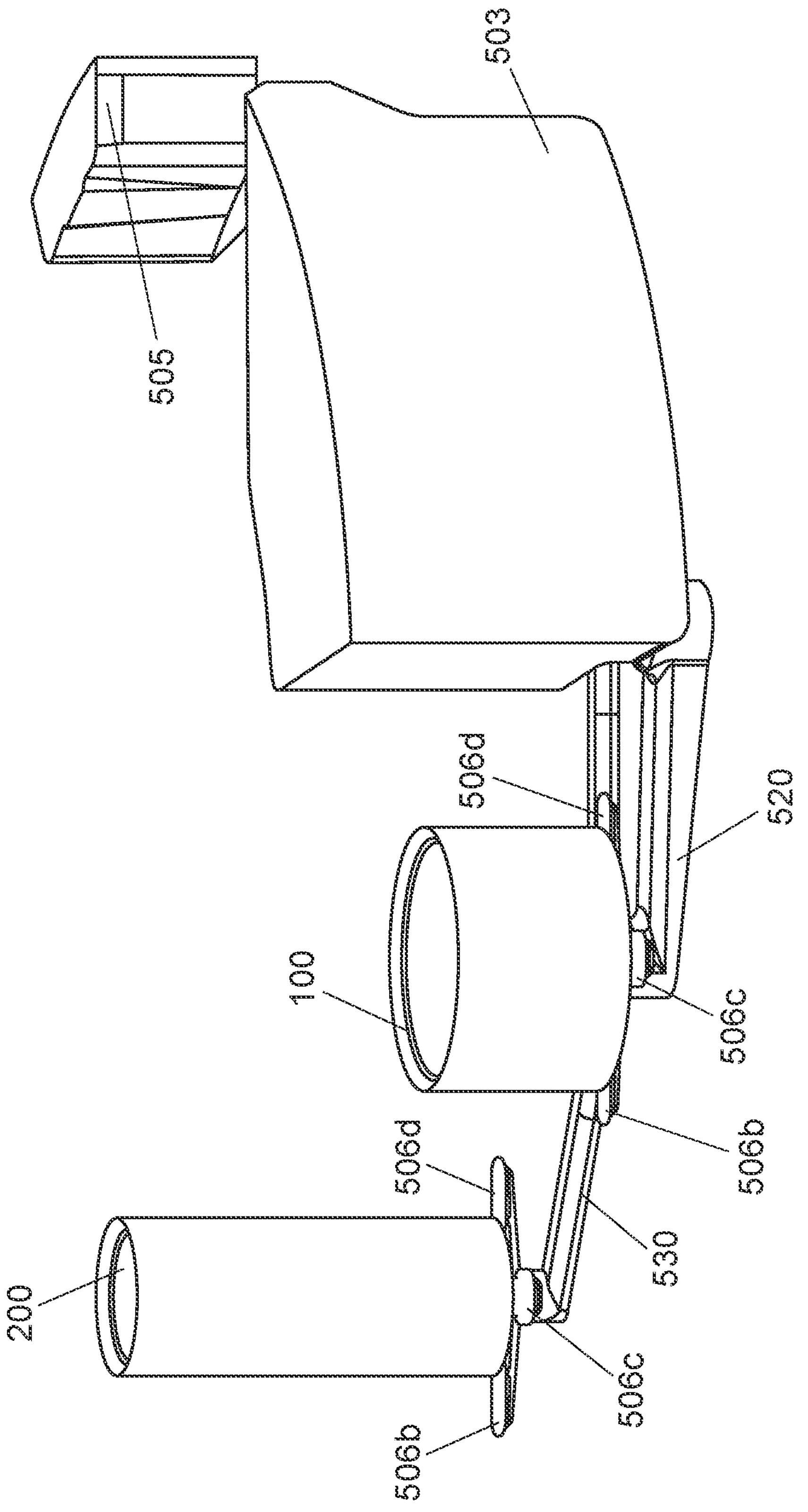
Figure 13C:
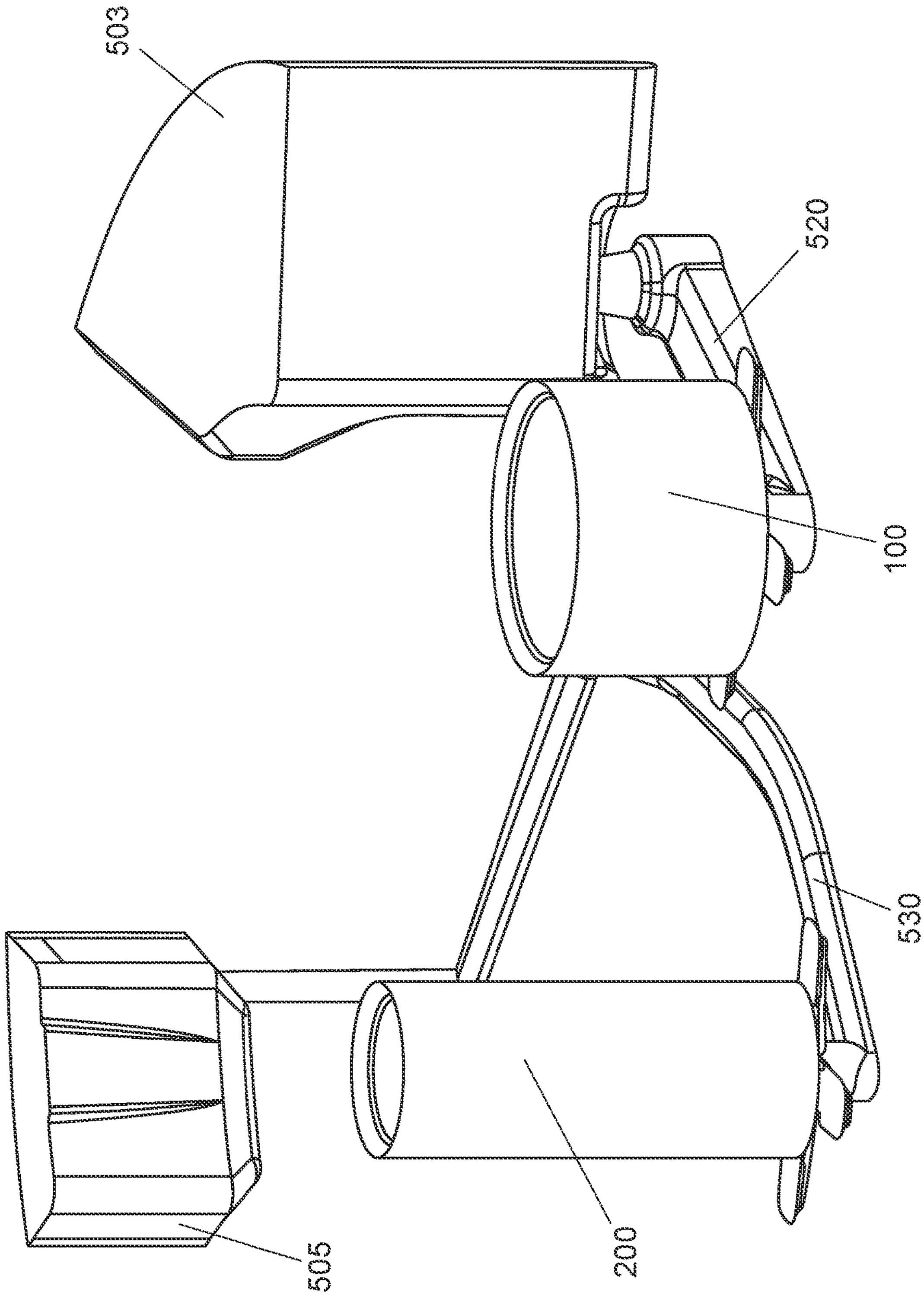

Additional details of fluidic connections between the buffer packs and chambers are shown in FIGS. 13A-13C. Partial views of the first chamber 503, third chamber 505, buffer pack 100 fluidically connected to first chamber 503, and buffer pack 200 fluidically connected to third chamber 505 are depicted. Channel 520 connects the buffer pack 100 to chamber 503. Channel 530 connects the buffer pack 200 to chamber 505. Also depicted are the spoke-like features 506*a*-506*d* which terminate into upwardly pointed sharp ends that form a piercing member. The channels 520 and 530 may be located in the bottom end of the cartridge. In some instances, the lateral walls of the channels may be formed by the bottom end of the cartridge and the top and bottom walls of the channels formed by a film (e.g., adhesive film) adhered to top and bottom surfaces of the bottom end of the cartridge. In another instance, the channels may be wholly formed within the bottom end of the cylinder.

A sample preparation cartridge can be assembled by preparing a sealing plate in which one or more buffer packs are installed. Inserting the sealing plate into the cylindrical structure such that the buffer pack(s) are positioned in the interior of the cylindrical structure and are aligned with piercing member(s) on the upper surface of the bottom end of the cylindrical structure. The sealing plate may be affixed to the top end of the cylindrical structure by any suitable means. For example, the periphery of the top end of the cylindrical structure may be smaller in diameter than the diameter of the sealing plate and the sealing plate may be heat-sealed to the top end of the cylindrical structure or may be adhered to the top end of the cylindrical structure by an adhesive. Use of an adhesive or heat seal fixedly attaches the sealing plate to the cylindrical structure. By fixedly attaching, it is meant that the bond between the sealing plate and the cylindrical structure is permanent to the extent that it cannot be reversed simply by manually pushing the two structures apart.

The cap may be positioned over the sealing plate inserted into the cylindrical structure by aligning the post 403 with the shaft 303 and the one or more actuating members with the opening in the sealing plate under which a buffer pack is installed. For example, FIG. 5 depicts a cap 400 with the post 403 aligned with shaft 303, actuating member 401 aligned with buffer pack 100 and actuating member 402 aligned with buffer pack 200. The post cap may be inserted into the shaft till the point at which the protrusions 405*a*-405*c* engage with the corresponding indentations in the shaft. The actuating member 401 and 402 may be inserted into guide members 304 and 305, respectively (see FIG. 6A).

In certain instances, the sealing plate and cap may be first assembled and then attached to the cylindrical structure or the sealing plate may be attached to the cylindrical structure followed by attaching the cap to the sealing plate.

A collection container comprising PCR tubes and a clip for connecting the container to the cylindrical structure may be attached to the cylindrical structure prior to or after attaching the sealing plate and the cap to the cylindrical structure.

In certain examples, design features may be included for attaching the sealing plate to the cylindrical structure. For example, FIG. 6A shows a rim-structure 507 on top end of the cylindrical structure which rim-structure includes a trench 507*a* sized to fit a downward extending member 308 (see FIG. 3D showing the lower surface of sealing plate 300) which is sized and shaped to fit in the trench.

The sealing plate also may include mating means that matingly fit and optionally lockingly engage with corresponding mating means on the cap. Any suitable mating means may be utilized. In one example depicted in FIG. 3D, the mating means on the sealing plate 300 may include an upward extending member 309 sized and shaped to fit inside the cap. Mating features 309*a* and 309*b* are positioned on the upward extending member 309. FIG. 8C shows the cap 400 with a periphery that extends downwards and is sized and shaped to fit over the upward extending member 309 and includes mating features 407*a* and 407*b* that matingly fit with the mating features 309*a* and 309*b* on the sealing plate.

Sample Preparation

The buffer packs disclosed herein can be used for dispensing buffer into a sample preparation cartridge for processing a sample. In certain instances, the sample preparation cartridge may be as disclosed herein.

A method for using the sample preparation cartridge provided herein is disclosed. The method may involve introducing a sample into a first chamber of the cartridge via the sample inlet in the sealing plate. See, e.g., FIG. 6A which shows sample inlet 306 in sealing plate 300. The sample inlet is positioned over the top opening 503*a* in the first chamber 503 of the cylindrical structure 501 in cartridge 500. FIGS. 8A and 8B show that the sample inlet is accessible under the cap when the cap is placed in the pre-activation stage.

After the sample is introduced into the first chamber of the cartridge, a user applies downward force on the cap. The downward force may be applied by pressing the palm or fingers onto the upper surface of the cap. In some instances, an instrument for preparing the sample using the sample preparation cartridge may be used for applying the downward force by, e.g., contacting the upper surface of the cap with a lid in the instrument.

In some instances, a user introduces the sample into the cartridge before or after placing the cartridge in a sample preparation instrument and then applies downward force on the cap either directly or by pressing a lid in the instrument on the cap.

Application of the downward force on the cap results in release of the buffer present in the buffer pack as explained in the previous sections. The buffer packs are fluidically connected to respective chambers in the sample preparation cartridge. For example, the sample preparation cartridge can include a first chamber that is fluidically connected to a first buffer pack and a third chamber that is fluidically connected to a second buffer pack. As shown in FIG. 6D, the cylindrical structure 501 of the sample preparation cartridge includes first chamber 503, a second chamber 504, and a third chamber 505. The first chamber is connected to the first buffer pack via a channel 520 present in the bottom end of the cylindrical structure which channel 520 runs from under the first piercing member present in the upper surface of the bottom end of the cylindrical structure to the bottom of the first chamber. When the first buffer pack contains lysis buffer, the first chamber is filled with the lysis buffer upon actuation of the buffer pack. The second chamber may be filled with an immiscible phase, e.g., hydrophobic oil or air. The third chamber may be connected to the second buffer pack via a channel 530 present in the bottom end of the cylindrical structure which channel 530 runs from under the second piercing member present in the upper surface of the bottom end of the cylindrical structure to the bottom of the third chamber. When the second buffer pack contains elution buffer, the third chamber is filled with the elution buffer upon actuation of the buffer pack.

The sample preparation cartridge may then be processed by an instrument to mix the lysis buffer in the first chamber with the sample and PMPs under conditions that allow the PMPs to bind to the target analyte (e.g., nucleic acids), transfer the PMPs to the second chamber where the air or oil prevents lysis buffer from being transported with the PMPs, and then to the third chamber where the elution buffer causes the target analyte to detach from the PMPs.

The elution buffer comprising the target analyte, if present, eluted from the PMPs in the third chamber can be analyzed to determine the presence or absence of the target analyte and optionally concentration of the target analyte. In some instances, the elution buffer may be manually removed from the third chamber of the cartridge. In certain instances, the sample preparation cartridge may include a system for transporting an elution buffer comprising a target analyte isolated from the sample into one or more collection containers for analysis of the target analyte. The system may include components that are configured to drive the elution buffer from the third chamber into one or more collection containers, e.g., PCR tubes or similar thin-walled containers or strips conducive to thermal cycling reactions or isothermal reactions. The force to cause ejection of the elution buffer from the third chamber and flow into the collection containers may be a positive pressure or a negative pressure. An example of a system that applies positive pressure on the elution buffer includes a plunger that is driven downwards in the third chamber forcing the elution buffer into collection containers. An example of a system that applied negative pressure to the elution buffer includes a separate plunger chamber which chamber includes a plunger that is depressed when the cap is pressed downwards. This system includes a feature for releasing the depressed plunger. Upon release, the plunger slides upward creating a negative pressure by creation of a vacuum that causes the elution buffer to flow from the third chamber to the collection containers.

The collections containers may be subjected to conditions suitable for detection of the target analyte. In some instances, the collection containers are subjected to polymerase chain reaction conditions to amplify the target analyte. The collection containers may include additional components required for amplifying the target analyte. Such components include a polymerase enzyme, primers, nucleotides, and buffer. The nucleotides may be detectably labeled in some cases. In some instances, the collection containers may include a dye that is incorporated into the amplifying product.

While the sample preparation cartridge may have numerous chambers for preparation of a sample, e.g., for isolating nucleic acid from a sample, the sample preparation cartridge depicted in the figures includes at least three chambers. The chambers may be present in the interior of the cartridge or in some cases on the exterior surface. In the cartridge depicted in the figures, the annular wall comprises cavities forming an open side of each of the plurality of chambers, and one or more channels providing fluidic communication between the plurality of chambers. The channels are formed by recesses in the annular wall and comprise an open side. One or more covers are affixed over exterior surface of the annular wall to cover and fluidically seal the open side of the chambers and the open side of the recesses. Additional components of the sample preparation cartridge and the instrument for processing the sample in the sample preparation cartridge are described in greater detail in PCT Application No. PCT/US2020/066926 filed on Dec. 23, 2020 which is herein incorporated by reference in its entirety.

The cylindrical structure may be rotatable around the axis formed by a line connecting the center of the bottom end of the cylindrical structure with the center of the top end of the cylindrical structure. The cylindrical structure comprises a plurality of cavities in the annular wall that form a plurality of open-sided chambers on the annular wall. For example, the plurality of cavities may be indentations in the annular wall that deform the continuous surface of the annular wall. In certain instances, the deformed annular wall may form closed sides of the chambers, and the area corresponding to the side of the annular wall that was deformed to form the cavity may form the open side of the chambers. According to certain embodiments, the open sides of the plurality of chambers are located on the exterior of the annular wall. The volume of a chamber may represent a measurement corresponding to the volume of the indentation in the annular wall. The chambers may be any convenient volume, and in some instances may vary from 1 $cm^3$ to about 5 $cm^3$, such as 1 $cm^3$ to 3 $cm^3$ or 2 $cm^3$ to 5 $cm^3$. In other instances, the chambers can contain any convenient volume of fluid, and in some instances may vary from 1 μL to about 5,000 μL, such as 1 μL to 100 μL or 1,000 μL to 3,000 μL or 2,000 μL to 5,000 μL. Each chamber of the plurality of chambers may have the same volume or may have different volumes. The depth of the chamber, measured as the distance from the outside surface of the annular wall to the inner side of the chamber, may be any convenient size, and in some instances, may be 0.1 cm or greater, such as 1 cm or 5 cm. Each chamber of the plurality of chambers may have the same depth or may have different depths.

According to certain embodiments, the plurality of chambers is positioned proximal to each other on the annular wall. For example, the distance between a lateral border of a first chamber and the closest lateral border of a second chamber may be about 0.1 cm or more, such as 0.5 cm to 1 cm, e.g., 0.5 cm or 0.75 cm or 5 cm. The distances between lateral sides of pairs of chambers positioned next to each other may be the same for the plurality of chambers or may differ. The plunger chamber may be located adjacent the third chamber, which may be the chamber where an analyte isolated from a sample is present. This chamber is also referred to as an elution chamber. The plunger chamber may be located adjacent the annular wall, on the annular wall, or inside the cylindrical structure. In certain example, the distance between a wall of the third chamber closest to the plunger chamber and the wall of the plunger chamber closest to the third chamber may be less than 5 cm, e.g., about 0.1 cm-4 cm, 0.5 cm-2 cm, and the like. An example of a plunger chamber 510 for providing negative pressure for drawing the elution buffer from the elution chamber (third chamber 505) into the collection containers is depicted in FIG. 6D. The plunger chamber includes plunger 511 that is depressed when the cap is pressed down. Another example of a plunger chamber comprising a plunger is depicted in FIG. 8A where the plunger 511 is visible. Specific examples of a negative pressure system for filling collection containers with an elution buffer are described in greater detailed in an U.S. Provisional Patent Application No. 63/143,587, titled "Magnetic Particle Separation Device Actuation System and Negative Pressure Filling," co-filed with this application, which application is herein incorporated by reference in its entirety.

As summarized above, sample preparation cartridges include one or more channels that provide fluidic communication between the plurality of chambers. In certain aspects, the channels are wide enough that one or more paramagnetic particles (PMPs) used for isolating a target analyte can be transported therethrough. In certain embodiments, one or more of the channels between chambers are formed by recess in the annular wall. FIG. 6D channel 512 connects chambers 503 and 504 and channel 513 connects chambers 504 and 505.

In certain examples, the third chamber includes an opening at a bottom region of the chamber. The opening at the bottom of the third chamber is fluidically connected to one or more collection containers. The collection containers may be two separate tubes, e.g., thin wall polypropylene tube suitable for amplification, e.g., PCR, as described above. The opening at the bottom of the third chamber may be fluidically connected to two channels that split from the opening to fill the two collection containers with substantially equal volume of liquid drained from the third chamber under the influence of the vacuum created in the plunger chamber.

The sample preparation cartridges include one or more covers that cover the open sides of the plurality of chambers and the interconnections to form channels. Use of a cover to form a wall of the chambers in the cylindrical device allows for a wall that is significantly thinner that the annular wall of the cylindrical structure. Use of a cover to form a wall of the chambers in the cylindrical device allows for a wall that is made from a material different from the material of the cylindrical structure.

The cover may be sufficiently thin to allow paramagnetic particles (PMPs) present in a chamber to be aggregated in response to the external magnet being located adjacent the chamber and to allow the aggregated PMPs to traverse thorough a channel connecting adjacent chambers in response to relative movement of the cylindrical structure and the external magnet. The cover may have a thickness of less than 1 cm, less than 0.5 cm, less than 0.1 cm, e.g., 1 mm-5 mm. In certain embodiments, the cover may be a film, e.g., an adhesive film.

By paramagnetic particles, it is meant magnetic particles capable of having an analyte of interest attached thereon, e.g., capable of having nucleic acids attached thereon. PMPs are magnetically responsive. Magnetically responsive particles include or are composed of magnetically responsive materials. Examples of magnetically responsive materials include paramagnetic materials, ferromagnetic materials, ferrimagnetic materials, and metamagnetic materials. Examples of suitable paramagnetic materials include iron, nickel, and cobalt, as well as metal oxides, such as $Fe_3O_4$, $BaFe_{12}O_{19}$, CoO, NiO, $Mn_2O_3$, $Cr_2O_3$, and CoMnP. PMPs may be comprised of a paramagnetic material enclosed in a non-magnetic polymer, such as, magnetic materials covered with a polymeric material or magnetic material embedded in a polymer matrix. Such particles may be referred to as magnetic or paramagnetic beads In certain embodiments, the cartridge is used for preparing a sample using an instrument in which the cartridge is placed. The instrument may further include a removable or permanently attached magnet for moving the PMPs from the first chamber via the first channel to the second chamber and so forth. The instrument may include a motor that rotates a platform in which the cartridge is placed. The platform of the instrument may rotate the cartridge back and forth to facilitate lysis of cells/viruses and release of the target analyte, e.g., nucleic acid. The PMPs are functionalized to bind to and immobilize the target analyte. The instrument may stop the back-and-forth rotation of the cartridge and rotate the cartridge such that the first chamber is adjacent a magnet present in the instrument. The magnet aggregates the PMPs. The magnet is positioned such that the aggregate is formed substantially at the opening of channel that fluidically connects the first chamber to the second chamber. The second chamber may include a wash buffer or an immiscible phase such as oil or air. The instrument then rotates the cartridge to transport the aggregate through the channel into the second chamber. While not depicted in the figures, the cartridge can include additional chambers, e.g., an immiscible phase chamber followed by a wash chamber and the like. The instrument then rotates the cartridge to transport the aggregate through the second channel into the third chamber.

The magnet when present, may be mounted on a housing which is disposed permanently or removably in the instrument. By magnet, it is meant any object having the ability to produce a magnetic field external to itself. For example, the magnet may produce a magnetic field capable of attracting paramagnetic particles. In some instances, the magnet may be an electromagnet. In certain embodiments, the magnet is positioned proximal to the exterior of the annular wall of the cartridge.

The rotatable platform of the instrument can be actuated using a motor. The motor can be automated thereby automating the methods of transporting a liquid from a chamber into one or more collection containers. The motor can also be controlled by a computer program, which when executed by a processor, causes the motor to perform the methods of using the system as disclosed herein.

The devices disclosed herein are suitable for methods of detection of nucleic acids in a short amount of time, such as less than 20 minutes, less than 15 minutes, less than 10 minutes, or less than 5 minutes, e.g., 1 minute-5 minutes.

In some cases, the cartridges and associated instrumentation are configured so that a sample can be loaded, the cover pressed down and the rest of the processing steps are automated. Thus, the results can be obtained with minimal user mediated steps. Particularly, the user may only need to load the sample in the cartridge and load the cartridge into the instrumentation, not necessarily in that order, push down the cap and actuate the analytical instrument to analyze the sample. The instrumentation is configured to process the sample to isolate the nucleic acids from the sample; deliver the nucleic acids into the collection containers, for example, PCR tubes; conduct the analysis, such as PCR; and present the results, for example, display on a screen, provide a printout, save on a computer system, or transmit the results to a remote computer system. Thus, the cartridges disclosed herein could be used in the appropriate sample analytical instrumentation, such as Abbott's ID NOW™ instrumentation, where the only user mediated step is loading of the sample into the cartridge and loading the cartridge into the analytical instrument (not necessarily in that order) and pressing down the cap. The appropriate computer program that controls the existing sample analytical instrument can be revised to operate and process the samples from a cartridge disclosed herein.

In certain aspects, the sample is a sample of whole blood, serum, plasma, sputum, nasal fluid, saliva, mucus, semen, urine, vaginal fluid, a tissue, organ, and/or the like of a mammal (e.g., a human, a rodent (e.g., a mouse), or any other mammal of interest). In other aspects, the sample is a collection of cells from a source other than a mammal, such as bacteria, yeast, insects (e.g., drosophila), amphibians (e.g., frogs (e.g., *Xenopus*)), viruses, plants, or any other non-mammalian nucleic acid sample source.

The cap may be configured to provide a tactile, visual, and/or auditory feedback to the user to indicate that the cap is properly located. For example, upon application of downward pressure by the user, the cap may slide down the shaft of the sealing plate and produce a clicking sound to indicate that the cap is properly positioned. In other embodiments, the cap may initially slide down rapidly and not move any further in response to further downward pressure by the user, indicating that the cap is properly positioned.

Figure 9:
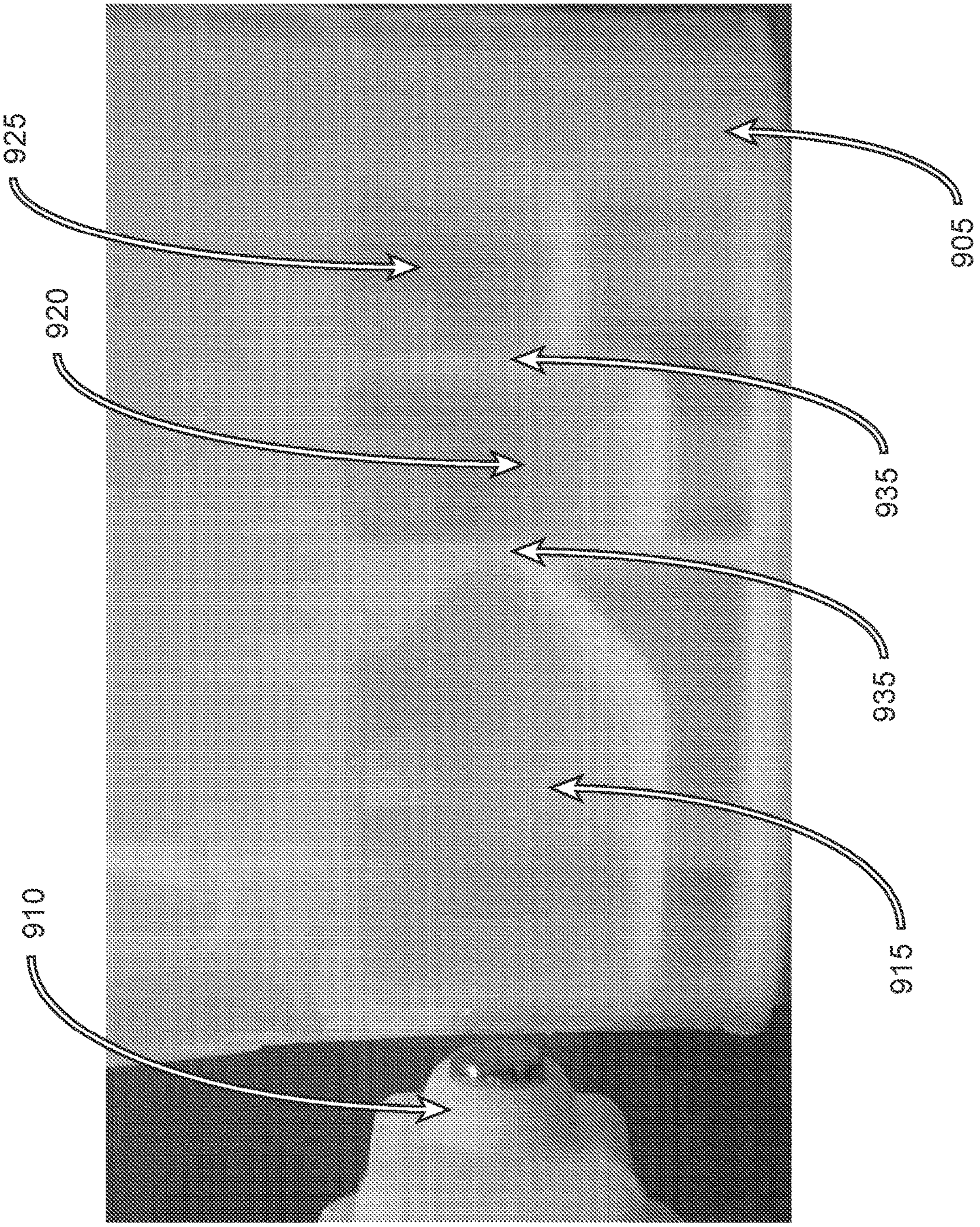
FIG. 9 shows an illustration of preparation system 900 including a sample preparation cartridge 905 and a magnet 910.

FIG. 9 shows an exemplary sample preparation system 900 comprising a sample preparation cartridge 905 and a magnet mounted on a housing 910. The sample preparation cartridge includes a first chamber 915 with a lysis buffer as well as, in some instances, paramagnetic particles to which nucleic acids can bind and a sample comprising cells, virus, and/or nucleic acid, a second chamber 920 with an immiscible phase (e.g., oil or air), and a third chamber 925 with an elution buffer. The sample preparation cartridge 905 further includes a first recess 935 in the annular wall interconnecting the first chamber 915 with the second chamber 920 and a second recess 935 in the annular wall interconnecting the second chamber 920 and the third chamber 925. The magnet 910 is used to transfer the magnetic particles between the chambers of the sample preparation cartridge.

Figure 10:
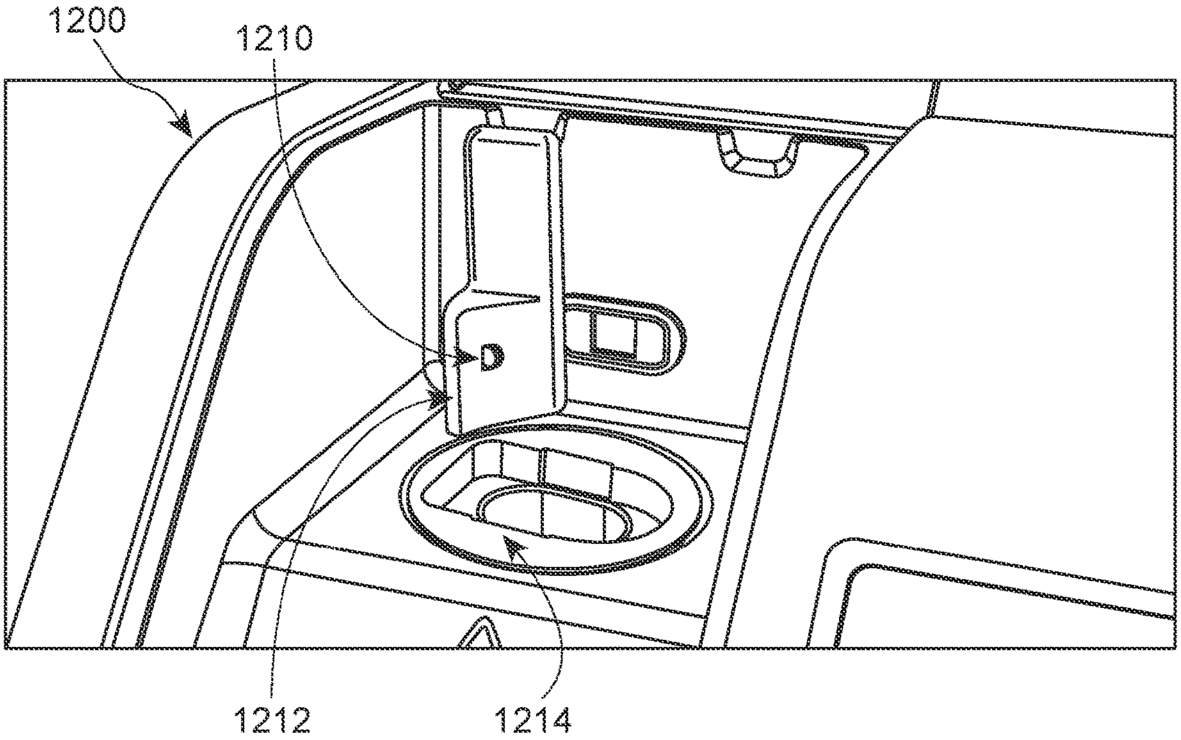
FIG. 10 shows a reusable magnet that could be used repeatedly for processing samples using disposable sample preparation cartridges. A reusable magnet can be placed in a sample processing instrument and can be used to process a plurality of cartridges thereby avoiding the need to use separate magnets for each disposable cartridge.

FIG. 10 shows a sample processing instrument 1200 configured to process a sample using a sample preparation cartridge disclosed herein. The sample processing instrument is fitted with a reusable magnet 1210. The reusable magnet is mounted on a support 1212 and placed on the instrument in a manner that the magnet is proximal to the cover of the sample preparation cartridge and can be used to move magnetic particles between different chambers of a disposable sample preparation cartridge by rotation of the sample preparation cartridge. The sample processing instrument includes a rotary component comprising a holder 1214 for the sample preparation cartridge. The rotary component is operably connected to a motor which can be actuated to rotate the cartridge.

Figure 11:
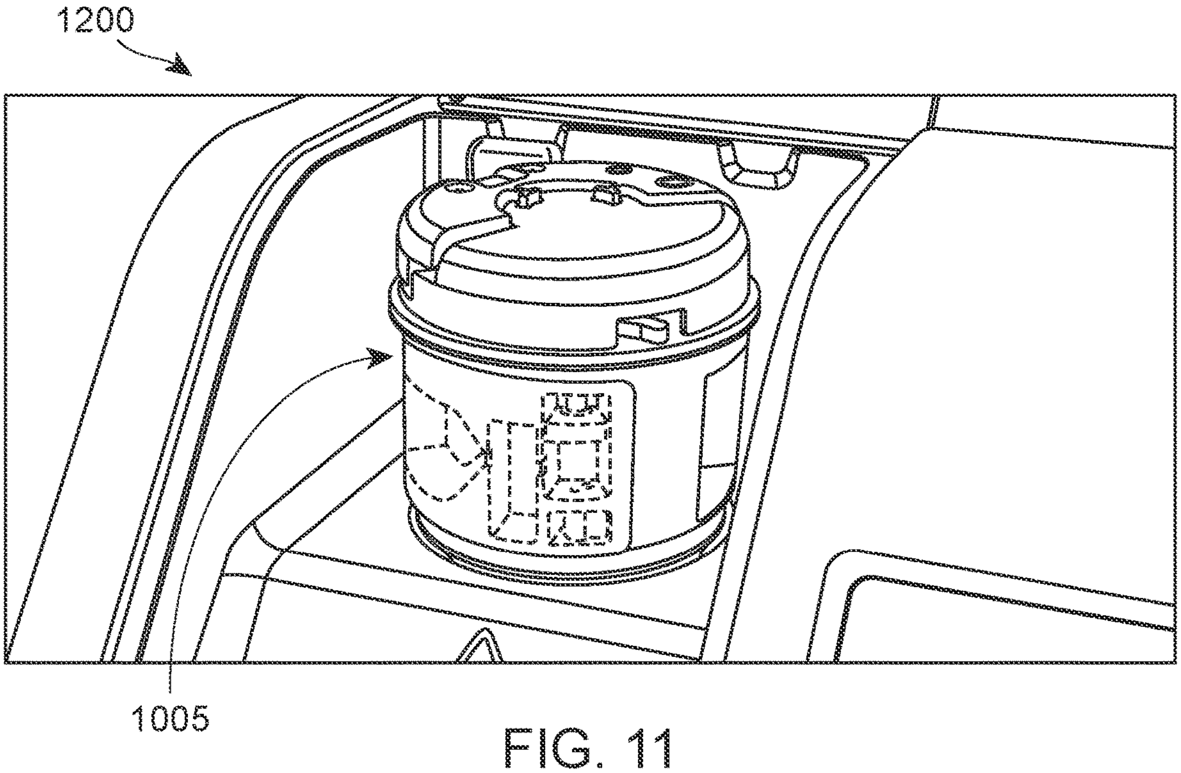
FIG. 11 shows a sample preparation cartridge 1005 placed in the sample processing instrument 1200 such that the magnet is positioned adjacent the sample preparation cartridge.

FIG. 11 shows a sample preparation cartridge 1005 placed in the sample processing instrument 1200 such that the magnet is situated adjacent the sample preparation cartridge. In the embodiment depicted in FIGS. 10 and 11, the magnet is stationary during sample preparation while the cartridge rotates about a central axis. The rotation of the cartridge places a chamber of the cartridge in proximity to the magnet.

Figure 12:
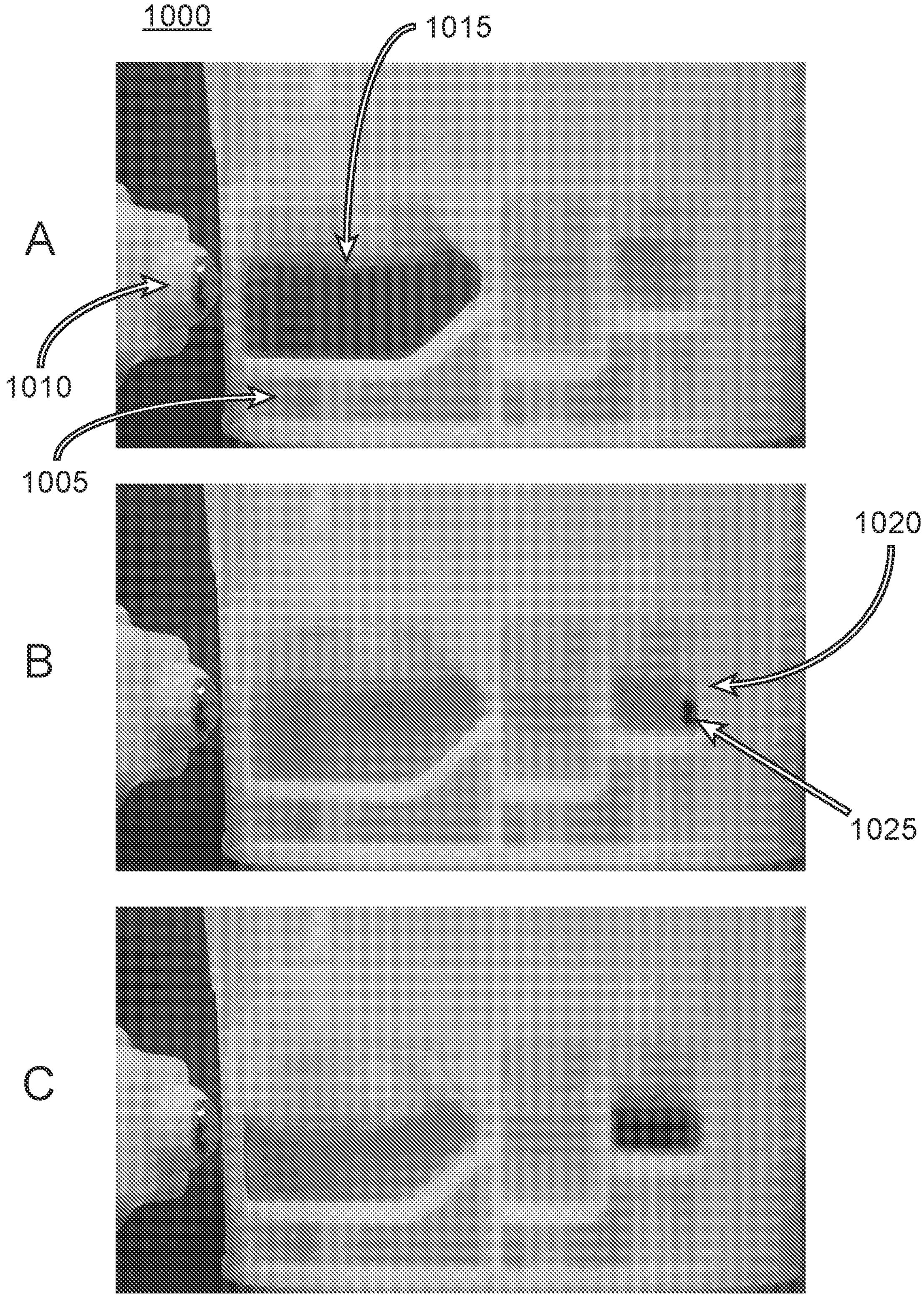
FIG. 12, Panels A, B and C, shows an illustration of transfer of PMPs in the chambers of a sample preparation cartridge.

FIG. 12 illustrates the transfer of PMPs from a first chamber to a third chamber of a sample preparation cartridge using a magnet. In the initial stage of sample preparation, a sample is contacted with a lysis buffer and PMPs in the first chamber 1015. The PMPs are dispersed as indicated by the dark color of the solution in the first chamber 1015. The sample preparation cartridge can be rotated to place different regions of the cartridge adjacent the magnet. Alternatively, the magnet can be positioned adjacent different regions of the cartridge by moving the magnet. Positioning a magnet 1010 adjacent the first chamber results in aggregation of the PMPs which can be transferred to the third chamber through the second chamber by relative movement between the magnet and the cartridge. Panel B shows an aggregate of paramagnetic particles 1025 in the third chamber 1020. In Panel C, the dark color of the solution in the third chamber 1020 illustrates that paramagnetic particles are mixed in the elution buffer in the third chamber 1020. After the analyte is eluted from the PMPs, the PMPs can be aggregated and moved back to the second or first chamber. The elution buffer can then be transferred into a collection container, e.g., PCR tubes in fluid communication with the third chamber. Alternatively, the elution buffer comprising the PMPs may be transferred into a collection container. As noted in the preceding sections, the transfer of elution buffer can be manual. For example, the elution buffer may be removed from the third chamber for further analysis. In other examples, the elution buffer can be removed by application of positive pressure, e.g., using a plunger to force the elution buffer out of the third chamber and into collection containers connected to the third chamber. Such a method is described in greater detail in PCT Application No. PCT/US2020/066926 filed on Dec. 23, 2020 which is herein incorporated by reference in its entirety.

Accordingly, the preceding merely illustrates the principles of the present disclosure. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. An assembly comprising a sealing plate and a buffer pack for dispensing a buffer, wherein:

the sealing plate has a substantially disk-shape, and comprises:

an upper surface opposite a lower surface, a first through-hole extending between the surfaces, the first through-hole comprising at least two diametrically opposite retaining features that extend from the lower surface and attach to an engagement feature of the buffer pack for dispensing the buffer, wherein the buffer pack comprises a cylindrical body comprising:

a smooth inner surface;

an outer surface comprising the engagement feature;

a top end sealed with a first pierceable cover;

a bottom end sealed with a second pierceable cover, wherein the first pierceable cover comprises a thickness at least twice the thickness of the second pierceable cover;

a compressible stopper in a sealing configuration with the inner surface of the cylindrical body, disposed below and adjacent the first pierceable cover, wherein the compressible stopper is configured to slide along the inner surface upon application of pressure on the stopper; and a buffer disposed between the second pierceable cover and the stopper, wherein the engagement feature comprises symmetrically placed indents, a flange, or two or more protrusions positioned at approximately diametrically opposite sides of the cylindrical body, wherein the retaining features immobilize the buffer pack in absence of downward pressure on the first pierceable cover and detach from the engagement feature upon application of downward pressure on the first pierceable cover.

2. The assembly of claim 1, wherein the sealing plate comprises a centrally located opening.

3. The assembly of claim 2, comprising a shaft extending below the lower surface from the centrally located opening.

4. The assembly of claim 3, wherein the shaft is hollow and comprises indents located in an interior surface of the shaft wherein the indents are located symmetrically along an internal diameter of the shaft.

5. The assembly of claim 1, further comprising a cap for actuating the buffer pack installed in the sealing plate, wherein the cap is sized to fit over the sealing plate, the cap comprising:

an upper surface opposite a lower surface;

and a first actuating member extending downwards from the lower surface and aligned with the first pierceable cover of the buffer pack and configured to pass through the first through-hole of the sealing plate, wherein the cap is positioned in a first position in which the cap is spaced-apart from the upper surface of the sealing plate, wherein when the cap is in the first position, the first actuating member does not exert downward force on the buffer pack.

6. The assembly of claim 5, wherein the cap comprises a centrally located post extending downwards from the lower surface and sized to fit inside the shaft in the sealing plate, wherein the post comprises protrusions sized to fit inside the indents in the shaft and hold the cap in the first position and wherein upon application of downward pressure on the cap, the protrusions disengage from the indents allowing the post to slide down the shaft such that the cap encloses the periphery of the sealing plate and snap-fits onto the sealing plate.

7. The assembly of claim 6, wherein, within the cap, the post comprises a rod-shaped structure comprising a plurality of fingers extending from a distal end of the rod-shaped structure, wherein the protrusions are located at a distal end of the plurality of fingers and wherein the shaft in the sealing plate comprises a diameter larger than the diameter of the post and wherein the shaft comprises a lip at a distal end and wherein upon application of downward pressure on the cap, the protrusions disengage from the indents allowing the post to slide down the shaft such that the protrusions are located under the lip and the cap cannot be retracted.

8. The assembly of claim 5, wherein, within the cap, the first actuating member comprises an elongated structure comprising a first length.

9. A sample preparation cartridge comprising:

a cylindrical structure comprising a top end and a bottom end and an annular wall extending between the top and bottom ends, and the assembly of claim 5, wherein the sealing plate is affixed to the top end of the cylindrical structure.

10. The cartridge of claim 9, wherein the bottom end comprises an upper surface opposite a lower surface and at least one buffer pack support feature on the upper surface and wherein the buffer pack support feature comprises a piercing member pointed up towards the second pierceable cover of the buffer pack.

11. The cartridge of claim 10, wherein the buffer pack support feature comprises a hollow cylindrical structure rising from the upper surface of the bottom end of the cartridge and sized to enclose the bottom end of the buffer pack.

12. The cartridge of claim 9, wherein the cap is configured to move downwards into a second position, wherein when the cap is moved into the second position, the first actuating member contacts the first pierceable cover and pushes the buffer pack downwards towards the piercing member in the cartridge thereby causing the second pierceable cover to be pierced, punctures the first pierceable cover, and then contacts the compressible stopper displacing it in a downward direction to release the buffer from the bottom end of the buffer pack.

13. The cartridge of claim 9, comprising a first chamber, a second chamber and a third chamber, wherein the first chamber is configured for filling with a lysis buffer, the second chamber comprises a non-aqueous phase comprising oil or air, and the third chamber is configured for filling with an elution buffer.

14. The cartridge of claim 13, wherein the cap comprises a second actuating member, wherein the sealing plate comprises a second through-hole extending between the first surface and the second surface of the sealing plate, wherein the buffer pack comprises a first buffer pack disposed through the first-through hole and a second buffer pack disposed through the second-through hole, wherein the second actuating member is aligned with the first pierceable cover of the second buffer pack.

15. The cartridge of claim 14, comprising a second buffer pack support feature, wherein the bottom end of a first buffer pack is located in a first buffer pack support feature and the bottom end of a second buffer pack is located in a second buffer pack support feature, wherein the first buffer pack comprises lysis buffer and the second buffer pack comprises elution buffer, wherein the first pack support feature comprises a first piercing member pointed up towards the second pierceable cover of the first buffer pack and the second pack support feature comprises a second piercing member pointed up towards the second pierceable cover of the second buffer pack.

16. The cartridge of claim 14, wherein the second actuating member comprises an elongated structure comprising a second length, wherein the first length is longer than the second length.

17. The cartridge of claim 16, wherein upon application of downward pressure on the cap, the first actuation member contacts the first buffer pack prior to the second actuation member contacting the second buffer pack, thereby releasing the lysis buffer prior to releasing the elution buffer.

18. The cartridge of claim 16, wherein the first actuation member releases a higher volume of the lysis buffer as compared to the volume of the elution buffer released by the second actuation member.

19. A method for using a cartridge of claim 9, the method comprising:

introducing a sample into a first chamber of the cartridge, wherein the introducing comprises loading the sample into the first chamber via an opening in the sealing plate, wherein the opening is aligned with an opening in a top end of the first chamber;

placing the cartridge into an instrument configured for processing the sample prior to or after the introducing;

exerting downward pressure on the cap till the cap is no longer movable in the downward direction; and actuating the instrument to process the sample.

20. The assembly of claim 1, wherein the buffer comprises a lysis buffer or an elution buffer.

21. The assembly of claim 1, wherein the engagement feature is placed at approximately at a mid-point between the top and bottom ends of the buffer pack.

22. The assembly of claim 1, wherein, in the buffer pack: (i) the first pierceable cover and/or the second pierceable cover comprises aluminum or (ii) the first pierceable cover comprises a first layer and a second layer, wherein the first and second layers are adhered to each other, optionally wherein the first layer comprises aluminum and the second layer comprises paper or the first layer comprises paper and the second layer comprises aluminum.

23. The assembly of claim 1, wherein, in the buffer pack, the buffer occupies 20% to 35% of the internal volume of the cylindrical body.

* * * * *